United States Patent [19]

Falla et al.

[11] Patent Number: 5,364,486

[45] Date of Patent: Nov. 15, 1994

[54] POUCH FOR PACKAGING FLOWABLE MATERIALS

[75] Inventors: Daniel J. Falla; Allen W. Ross; Robert S. Elliott, all of Sarnia, Canada

[73] Assignee: The Dow Chemical Company, Midland, Mich.

[21] Appl. No.: 154,046

[22] Filed: Nov. 17, 1993

Related U.S. Application Data

[62] Division of Ser. No. 742,800, Aug. 9, 1991, Pat. No. 5,288,531.

[51] Int. Cl.$^5$ ............................................. B32B 31/20
[52] U.S. Cl. ................................. 156/308.4; 156/145; 156/292
[58] Field of Search ....................... 156/145, 292, 308.4

[56] References Cited

U.S. PATENT DOCUMENTS

| | | | |
|---|---|---|---|
| 3,250,825 | 5/1966 | Martinovich | 260/897 |
| 3,682,767 | 8/1972 | Britton et al. | 161/127 |
| 3,741,253 | 6/1973 | Brax et al. | 138/137 |
| 3,900,635 | 8/1975 | Funderbunk, Jr. et al. | 428/213 |
| 4,071,674 | 1/1978 | Kashiwa et al. | 526/125 |
| 4,076,698 | 2/1978 | Anderson et al. | 526/348.6 |
| 4,123,576 | 10/1978 | Kobayashi et al. | 428/35 |
| 4,151,318 | 4/1979 | Marshall | 428/35 |
| 4,205,021 | 5/1980 | Morita et al. | 525/240 |
| 4,243,619 | 1/1981 | Fraser et al. | 264/40.6 |
| 4,265,949 | 5/1981 | Kugimiya | 428/35 |
| 4,294,947 | 10/1981 | Doerk et al. | 526/119 |
| 4,302,565 | 11/1981 | Goeke et al. | 526/88 |
| 4,302,566 | 11/1981 | Karol et al. | 526/125 |
| 4,303,710 | 12/1981 | Bullard et al. | 428/35 |
| 4,311,752 | 1/1982 | Diedrich et al. | 428/220 |
| 4,328,328 | 5/1982 | Minami et al. | 526/125 |
| 4,333,299 | 6/1982 | Hamilton | 53/450 |
| 4,346,834 | 8/1982 | Mazumdar | 229/54 R |
| 4,356,221 | 10/1982 | Anthony et al. | 428/35 |
| 4,357,191 | 11/1982 | Bullard et al. | 156/244.14 |
| 4,367,841 | 1/1983 | Mazumdar | 229/54 R |
| 4,390,573 | 6/1983 | Bullard et al. | 428/35 |
| 4,405,666 | 9/1983 | Squier | 428/35 |
| 4,405,667 | 9/1983 | Christensen et al. | 428/35 |
| 4,418,114 | 11/1983 | Briggs et al. | 428/218 |
| 4,429,079 | 1/1984 | Shibata et al. | 525/240 |
| 4,447,480 | 5/1984 | Lustig et al. | 428/35 |
| 4,503,102 | 3/1985 | Moilison | 428/35 |
| 4,505,969 | 3/1985 | Weiner | 428/213 |
| 4,521,437 | 6/1985 | Storms | 426/130 |
| 4,525,257 | 6/1985 | Kurtz et al. | 204/159.2 |
| 4,534,154 | 8/1985 | Gaubert | 53/458 |
| 4,547,413 | 10/1985 | Lustig et al. | 428/35 |
| 4,565,720 | 1/1986 | Yaeo et al. | 428/35 |
| 4,565,742 | 1/1986 | Lang | 428/476.3 |
| 4,640,856 | 2/1987 | Ferguson et al. | 428/36 |
| 4,668,752 | 5/1987 | Tominari et al. | 526/348.2 |
| 4,701,359 | 10/1987 | Akao | 428/35 |
| 4,775,562 | 10/1988 | Shishido et al. | 428/35 |
| 4,801,486 | 1/1989 | Quacquarella et al. | 428/34.9 |
| 4,820,557 | 4/1989 | Warren | 428/34.9 |
| 4,837,084 | 6/1989 | Warren | 428/349 |

(List continued on next page.)

FOREIGN PATENT DOCUMENTS 893216  2/1972  Canada .

(List continued on next page.)

OTHER PUBLICATIONS

Film Extrusion Manual: process, materials, properties/-prepared by the Film Extrusion Committee of the Polymers, Laminations and Coatings Division; Thomas I. Butler and Earl W. Veazey, Co-editors, Tappi Press 1992, Chapter 19C, Ultra Low-Density Polyethylene by Thomas I. Butler (three pages).

(List continued on next page.)

*Primary Examiner*—Michael W. Ball
*Assistant Examiner*—Francis J. Lorin

[57] ABSTRACT

An environmentally friendly polymer film pouch made from a polyethylene film structure for the packaging of flowable materials, for example milk, including, for example, a pouch made from a multilayer film structure such as a two-layer or a three-layer coextruded film containing at least one layer of ultra low density linear polyethylene, as a seal layer.

3 Claims, 6 Drawing Sheets

U.S. PATENT DOCUMENTS

| | | | |
|---|---|---|---|
| 4,863,769 | 9/1989 | Lustig et al. | 428/34.9 |
| 4,869,912 | 9/1989 | McCoy et al. | 426/123 |
| 4,877,663 | 10/1989 | Kambe et al. | 428/35.5 |
| 4,927,708 | 5/1990 | Herran et al. | 428/332 |
| 4,963,419 | 10/1990 | Lustig et al. | 428/36.7 |
| 5,041,316 | 8/1991 | Parnell et al. | 428/35.4 |
| 5,059,481 | 10/1991 | Lustig et al. | 428/39.9 |

FOREIGN PATENT DOCUMENTS

| | | |
|---|---|---|
| 1024948 | 1/1978 | Canada . |
| 1080597 | 7/1980 | Canada . |
| 1099878 | 4/1981 | Canada . |
| 1113898 | 12/1981 | Canada . |
| 1115014 | 12/1981 | Canada . |
| 1153991 | 9/1983 | Canada . |
| 1157624 | 11/1983 | Canada . |
| 1171623 | 7/1984 | Canada . |
| 1176019 | 10/1984 | Canada . |
| 1178760 | 12/1984 | Canada . |
| 1180261 | 1/1985 | Canada . |
| 1186981 | 5/1985 | Canada . |
| 1199567 | 1/1986 | Canada . |
| 1205052 | 5/1986 | Canada . |
| 1211083 | 9/1986 | Canada . |
| 1223514 | 6/1987 | Canada . |
| 1228578 | 10/1987 | Canada . |
| 1238752 | 7/1988 | Canada . |
| 2018391 | 1/1991 | Canada . |
| 2033844 | 1/1991 | Canada . |
| 2049920 | 1/1991 | Canada . |
| 2003282 | 5/1991 | Canada . |
| 1286642 | 7/1991 | Canada . |
| 2051132 | 9/1991 | Canada . |
| 1291311 | 10/1991 | Canada . |
| 1295449 | 2/1992 | Canada . |
| 0002606 | 6/1979 | European Pat. Off. . |
| 0057238 | 8/1981 | European Pat. Off. . |
| 0120503 | 10/1984 | European Pat. Off. . |
| 0221726 | 10/1986 | European Pat. Off. . |
| 0217252 | 4/1987 | European Pat. Off. . |
| 0289209 | 7/1988 | European Pat. Off. . |
| 0305959 | 8/1988 | European Pat. Off. . |
| 0103942 | 9/1988 | European Pat. Off. . |
| 4152086 | 11/1979 | Japan . |
| 5719353 | 11/1982 | Japan . |
| 8109547 | 6/1983 | Japan . |
| 8120654 | 7/1983 | Japan . |
| 9075933 | 4/1984 | Japan . |
| 157670 | 12/1989 | Japan . |
| 1364300 | 8/1974 | United Kingdom . |
| 2121062 | 6/1983 | United Kingdom . |

OTHER PUBLICATIONS

Handbook of Plastic Materials and Technology, Edited by Irvin I. Rubin, A Wilsey–Interscience Publication, 27.6 Applications, p. 315 (three pages).

Performance Resins for Film Applications, LLDPE, HDPE, Flexomer TM Polyolefins, Copyright 1991 Union Carbide Chemicals & Plastics Technology Corporation (four pages).

Modern Plastics Encyclopedia '92, Mid–October 1991 Issue, Resins and Compounds. Cover Sheet plus pp. 54, 56, 57.

Du Pont Canada, Why New Sclairfilm SM–3 Reduces Pouch Leakers, product information from Du Pont Canada Inc., Packaging Division.

Martin L. Fischer & Jerome W. Hammond, Costs and Impacts of Alternative Milk Packaging Systems, Dept. of Ag. & Applied Economics, Univ. of Minnesota, Nov. 1978.

L. D. Cady, Ultralow–Density Polyethylene, p. 66, Modern Plastics Encyclopedia 1989, Mid October 1988 issue; vol. 65, 11.

Richard O. Welsh, Robert G. Hunt, Resource & Environmental Profile Analysis of Five Milk Container Systems, 1978, U.S. Dept. of Commerce PB–294 193, Mo.

H. Ruinaard, DSM Kunstoffen BV, Developments in Flexible Packaging, Mar. 19, 1990.

R. L. Bud Smith, Pouch Packaging Environmentally Friendly Packaging for the 1990's, Mar. 7, 1990.

POUCH FOR PACKAGING FLOWABLE MATERIALS

CROSS-REFERENCE TO RELATED APPLICATION

This application is a divisional of copending application Ser. No. 07/742,800 filed Aug. 9, 1991 now U.S. Pat. No. 5,288,531.

BACKGROUND OF THE INVENTION

This invention relates to a pouch used in consumer packaging made from certain film structures useful for packaging flowable materials, for example liquids such as milk.

U.S. Pat. Nos. 4,503,102 and 4,521,437 disclose the preparation of a polyethylene film for use in the manufacture of a disposable pouch for packaging of liquids such as milk. U.S. Pat. No. 4,503,102 discloses pouches made from a blend of a linear ethylene copolymer copolymerized from ethylene and an alpha-olefin at the $C_4$ to $C_{10}$ range and a ethylene-vinyl acetate polymer copolymerized from ethylene and vinyl acetate. The linear polyethylene copolymer has a density of from 0.916 to 0.930 $g/cm^3$ and a melt index of from 0.3 to 2.0 g/10 minutes. The ethylene-vinyl acetate polymer has a weight ratio of ethylene to vinyl acetate from 2.2:1 to 24:1 and a melt index of from 0.2 to 10 g/10 minutes. The blend disclosed in U.S. Pat. No. 4,503,102 has a weight ratio of linear low density polyethylene to ethylene-vinyl acetate polymer of from 1.2:1 to 4:1. U.S. Pat. No. 4,503,102 also discloses laminates having as a sealant film the aforementioned blend.

U.S. Pat. No. 4,521,437 describes pouches made from a sealant film which is from 50 to 100 parts of a linear copolymer of ethylene and octene-1 having a density of from 0.916 to 0.930 $g/cm^3$ and a melt index of 0.3 to 2.0 g/10 minutes and from 0 to 50 parts by weight of at least one polymer selected from the group consisting of a linear copolymer of ethylene and a $C_4$–$C_{10}$-alpha-olefin having a density of from 0.916 to 0.930 $g/cm^3$ and a melt index of from 0.3 to 2.0 g/10 minutes, a high-pressure polyethylene having a density of from 0.916 to 0.924 $g/cm^3$ and a melt index of from 1 to 10 g/10 minutes and blends thereof. The sealant film disclosed in the U.S. Pat. No. 4,521,437 is selected on the basis of providing (a) pouches with an M-test value substantially smaller, at the same film thickness, than that obtained for pouches made with film of a blend of 85 parts of a linear ethylene/butene-1 copolymer having a density of about 0.919 $g/cm^3$ and a melt index of about 0.75 g/10 minutes and 15 parts of a high pressure polyethylene having a density of about 0.918 $g/cm^3$ and a melt index of 8.5 g/10 minutes, or (b) an M(2)-test value of less than about 12%, for pouches having a volume of from greater than 1.3 to 5 liters, or (c) an M(1.3)-test value of less than about 5% for pouches having a volume of from 0.1 to 1.3 liters. The M, M(2) and M(1.3)-tests are defined pouch drop tests in U.S. Pat. No. 4,521,437. The pouches may also be made from composite films in which the sealant film forms at least the inner layer.

The polyethylene pouches known in the prior art have some deficiencies. The problems associated with the prior art known films relate to the sealing properties and performance properties of the film for preparing pouches. In particular, prior art films made into pouches have a high incident of "leakers", i.e., seal defects such as pinholes which develop at or near the seal in which flowable material, for example milk, escapes from the pouch. Although the seal and performance properties of the prior art films have been satisfactory, there is still a need in the industry for better seal and performance properties in films for manufacture of hermetically sealed pouches containing flowable materials. More particularly, there is a need for improved sealing properties of the film such as hot tack and heat seal initiation temperature in order to improve the processability of the film and to improve pouches made from the films.

For example, the line speed of known packaging equipment used for manufacturing pouches such as form, fill and seal machines, is currently limited by the sealing properties of the film used in the machines. Prior art polyethylene films have high hot tack seal initiation temperatures and a narrow sealing range. Therefore, the speed at which a form, fill and seal machine can produce a pouch is limited and, thus, the number of pouches produced on a form, fill and seal machine is limited. If the heat seal temperature range, where one could obtain strong seals, is broadened, then the speed of a form, fill and seal machine can be increased and, thus, the number of pouches produced can be increased. Until the present invention, many have attempted to broaden the heat seal temperature range of pouch film without success.

It is desired to provide a polyethylene film structure for a pouch container having a broad heat sealing range with performance properties as good or better than the known prior art pouch films.

It is also desired to provide a film structure for a pouch container having a heat seal layer of ultra low density polyethylene such that the film structure has a broader sealing range for pouch conversion and has acceptable physical properties in the finished product.

It is further desired to provide a pouch made from the aforementioned film structures such that the pouch has a reduced failure rate.

SUMMARY OF THE INVENTION

One aspect of the present invention is directed to a pouch for the packaging of liquid consumer products, said pouch made from a film structure including at least one layer of an ultra low density polyethylene being a linear ethylene copolymer interpolymerized from ethylene and at least one alpha-olefin in the range of $C_3$–$C_{10}$ and having (1) a density of less than about 0.915 $g/cm^3$, (2) a melt index of less than about 10.0 g/10 minutes and (3) (i) a hot tack or heat seal initiation temperature of less than about 100° C. at a force of at least about 1N/inch (39.4N/m) or (ii) achieving a hot tack strength of at least 1N/inch (39.4N/m) at a seal bar temperature of about 110° C. and at less than about 0.2 seconds using the DTC Hot Tack Strength Method or achieving a heat seal strength of at least 1 lb$_f$/inch (175N/m) at a seal bar temperature of about 110° C. and at less than about 0.25 seconds using the DTC Heat Seal Strength Method.

One embodiment of the present invention is a pouch made from a two-layer coextruded film containing an outer layer of linear low density polyethylene and an inner seal layer of the aforementioned ultra low density linear polyethylene.

Another embodiment of the present invention is a pouch made from a three-layer coextruded film containing an outer layer and a core layer of linear low density polyethylene and an inner seal layer of the aforementioned ultra low density linear polyethylene.

Another aspect of the present invention is a process for preparing the aforementioned pouch.

It has been discovered that the film structures for the pouches of the present invention have a better seal at lower sealing temperatures and shorter dwell times than currently obtainable with commercially available film. Use of the films for making pouches of the present invention in form, fill and seal machines leads to machine speeds higher than currently obtainable with the use of commercially available film.

DETAILED DESCRIPTION OF THE PREFERRED EMBODIMENTS

Figure 1:
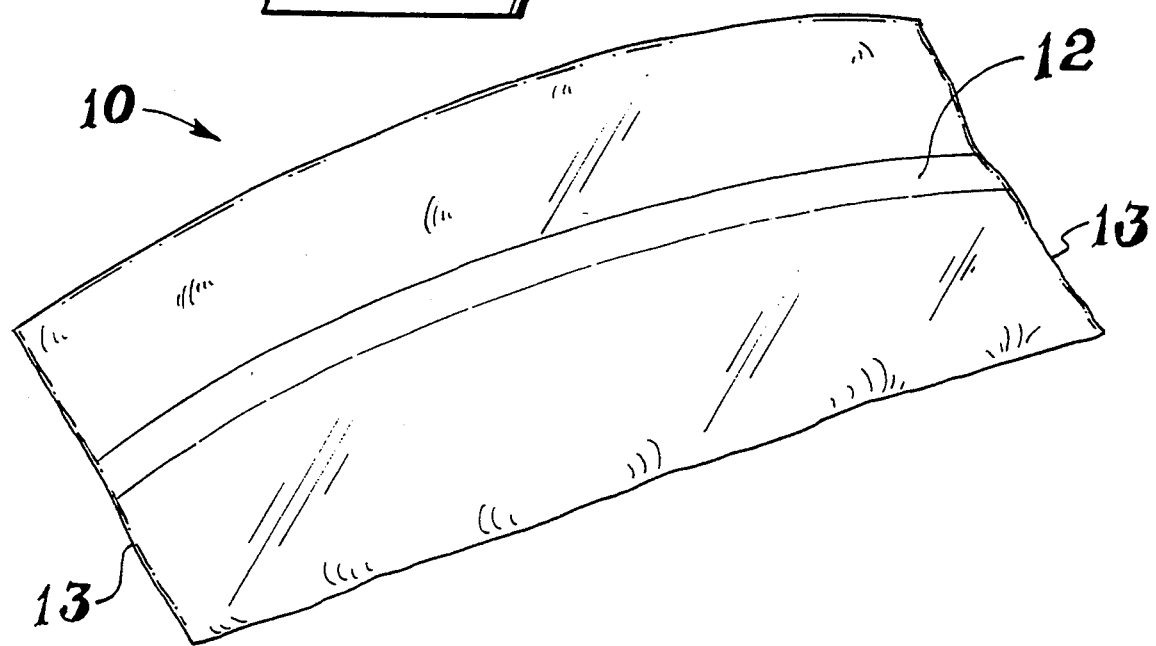
FIG. 1 shows a perspective view of a pouch package of the present invention.
Figure 2:
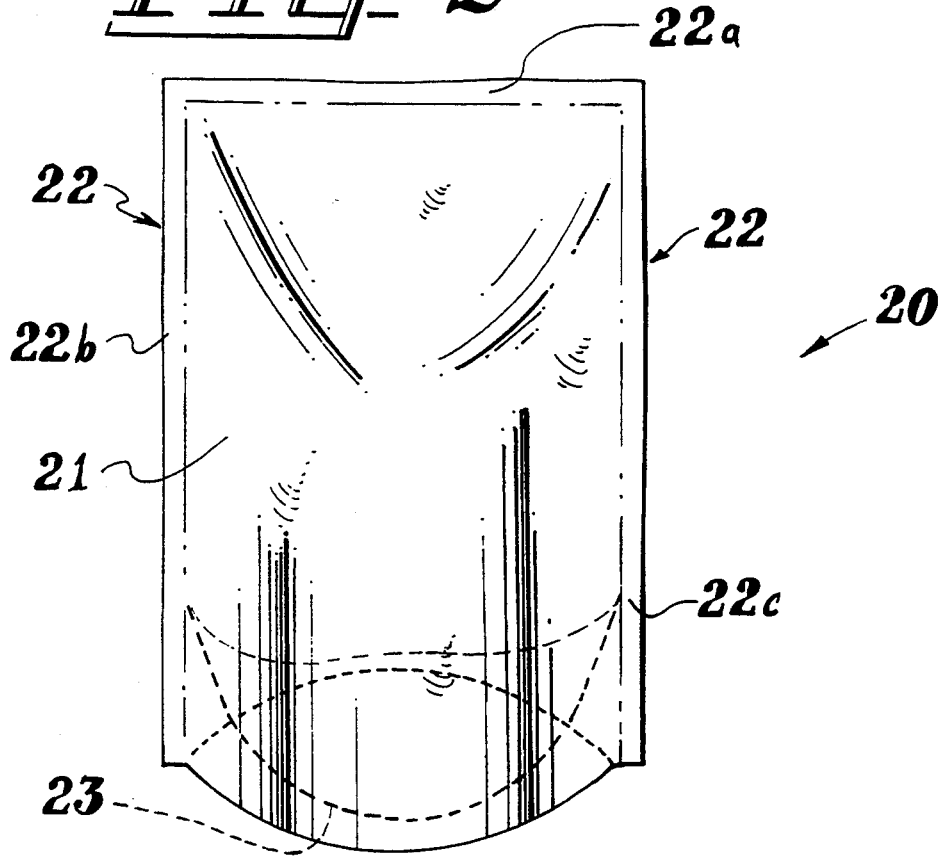
FIG. 2 shows a perspective view of another pouch package of the present invention.

In its broadest scope, the pouch of the present invention, for example as shown in FIGS. 1 and 2, for packaging flowable materials is manufactured from a monolayer film structure of a polymeric seal layer which is a polyethylene film layer, preferably, a polyethylene referred to hereinafter as "ultra low density polyethylene" ("ULDPE"). An example of a commercially available ULDPE is ATTANE TM (Trademark of and commercially available from The Dow Chemical Company). The ULDPE of the present invention is generally a linear copolymer of ethylene with at least one $\alpha$-olefin having from 3 to 10 carbon atoms, for example, the ULDPE may be selected from ethylene-1-propylene, ethylene-1-butene, ethylene-1-pentene, ethylene-4-methyl-1-pentene, ethylene-1-hexene, ethylene-1-heptene, ethylene-1-octene and ethylene-1-decene copolymers, preferably ethylene-1-octene copolymer.

Generally, the polymeric seal layer has a density of less than about 0.915 g/cm$^3$, preferably from about 0.89 to about 0.915 g/cm$^3$; generally has a melt index of less than about 10 g/10 minutes, preferably from about 0.1 to about 10 g/10 minutes; more preferably from about 0.5 about to 5.0 g/10 minutes; and generally has an indicator of molecular weight distribution ($I_{10}/I_2$) of less than about 20, preferably from about 5 to about 20, more preferably from about 7 to about 20 and even more preferably from about 6 to about 18. The thickness of the seal layer may be from at least about 0.1 mil (2.5 microns) and greater, preferably from about 0.2 mil (5 microns) to about 10 mil (254 microns) and more preferably from 0.4 mil (10 microns) to 5 mil (127 microns).

A surprising feature of the pouch's film structure of the present invention is the film's broad heat sealing range. Generally, the heat sealing range of the film structure can be from about 70° C. to about 140° C. and preferably from about 75° C. to about 130° C. It has been found that the seal layer of the present invention has a broader heat seal range than prior art polyethylene film having higher densities. A broad heat sealing range is important to allow for more flexibility in the heat sealing process used for making pouches from the film structure.

Another unexpected feature of the pouch's film structure of the present invention is the film's heat seal strength at low temperatures. Generally, the film structure of the present invention achieves a hot tack strength of at least about 1N/inch (39.4N/m) at a seal bar temperature of about 110° C. and at less than about 0.2 seconds using the DTC Hot Tack Strength Method defined hereinbelow or achieves a heat seal strength of at least 1 lb$_f$/inch (175N/m) at a seal bar temperature of about 110° C. and at less than 0.25 seconds using the DTC Heal Seal Strength Method defined hereinbelow. The film structure of the present invention also has a hot tack or heat seal initiation temperature of less than about 100° C. at a force of at least about 1N/inch (39.4N/m). It has been found that a seal made with the seal layer of the present invention has a higher strength at lower sealing temperatures than seals with a prior art polyethylene having higher densities. A high heat seal strength at low temperatures is important to allow conventional packaging equipment such as a vertical form, fill and seal machine to run at faster rates and to produce pouches with fewer leakers.

It is believed that the use of ULDPE in a film structure for pouches of the present invention (1) provides a pouch that can be fabricated at a fast rate through a form, fill and seal machine and (2) provides a pouch package having few leakers, particularly when the pouch of the present invention is compared to pouches made with linear low density polyethylene, low density polyethylene or a combination thereof.

Another embodiment of the present invention includes a pouch made from a blend of (a) from 10 to 100 percent by weight of at least one linear ethylene copolymer interpolymerized from ethylene and at least one alpha-olefin in the range of $C_3$–$C_{10}$ and having a density of less than about 0.915 g/cm$^3$ and a melt index of less than about 10.0 g/10 minutes, and (b) from 0 to 90 percent by weight of at least one polymer selected from the group consisting of a linear copolymer of ethylene and a $C_3$–$C_{18}$-alpha-olefin having a density of greater than about 0.916 g/cm$^3$ and a melt index of from 0.1 to 10 g/10 minutes, a high-pressure low-density polyethylene having a density of from 0.916 to 0.930 g/cm$^3$ and a melt index of from 0.1 to 10 g/10 minutes and an ethylene-vinyl acetate (EVA) copolymer having a weight ratio of ethylene to vinyl acetate from 22:1 to 24:1 and a melt index of from 0.2 to 20 g/10 minutes.

Figure 3:
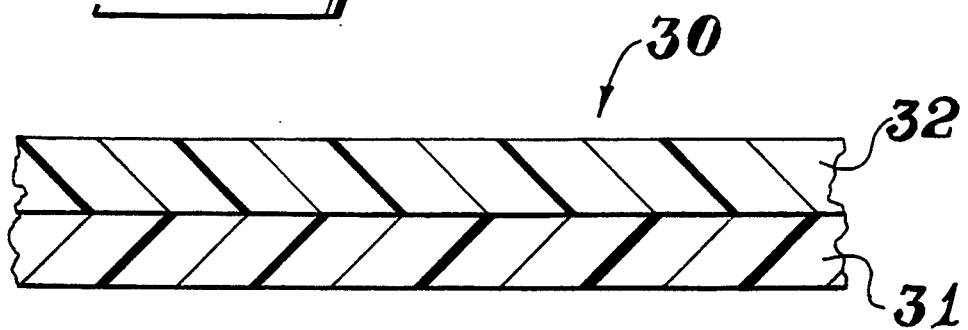
FIG. 3 shows a partial, enlarged cross-sectional view of the film structure of a pouch of the present invention.
Figure 4:
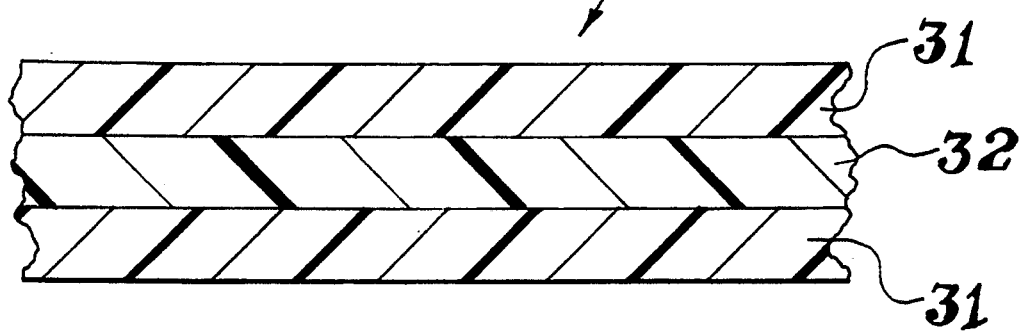
FIG. 4 shows another partial, enlarged cross-sectional view of another embodiment of the film structure of a pouch of the present invention.
Figure 5:
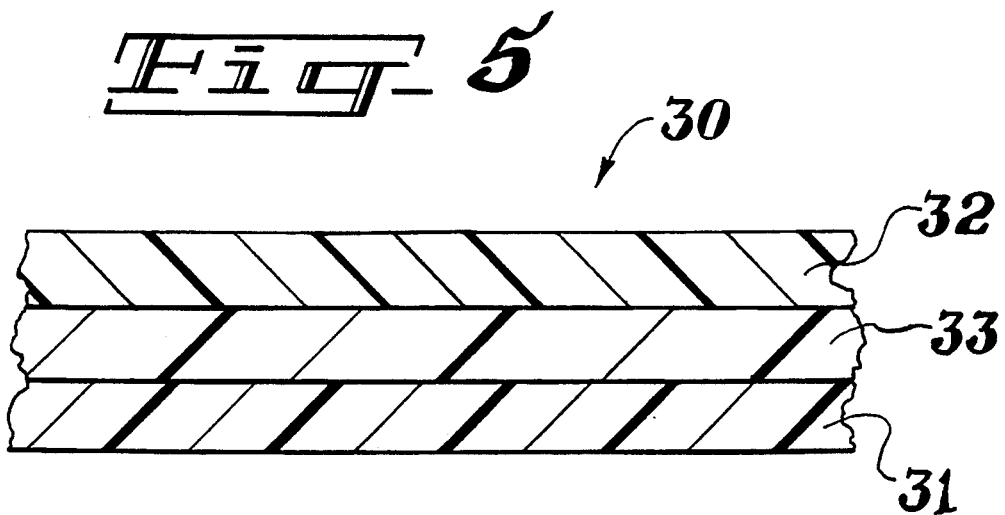
FIG. 5 shows yet another partial, enlarged cross-sectional view of another embodiment of the film structure of a pouch of the present invention.

With reference to FIGS. 3 to 5, the film structure of the pouch of the present invention also includes a multilayer or composite film structure 30, preferably containing the above-described polymeric seal layer being the inner layer of the pouch.

As will be understood by those skilled in the art, the multilayer film structure for the pouch of the present invention may contain various combination of film layers as long as the seal layer forms part of the ultimate film structure. The multilayer film structure for the pouch of the present invention may be a coextruded film, a coated film or a laminated film. The film structure also includes the seal layer in combination with a barrier film such as polyester, nylon, EVOH, polyvinylidene dichloride (PVDC) such as SARAN ™ (Trademark of The Dow Chemical Company) and metallized films. The end use for the pouch tends to dictate, in a large degree, the selection of the other material or materials used in combination with the seal layer film. The pouches described herein will refer to seal layers used at least on the inside of the pouch.

One embodiment of the film structure 30 for the pouch of the present invention, shown in FIG. 3, comprises an ultra low density polyethylene seal layer 31 and at least one polymeric outer layer 32. The polymeric outer layer 32 is preferably a polyethylene film layer, more preferably a polyethylene referred to hereinafter as "linear low density polyethylene" ("LLDPE"). An example of a commercially available LLDPE is DOWLEX ™ 2073 (Trademark of and commercially available from The Dow Chemical Company). The LLDPE is generally a linear copolymer of ethylene and a minor amount of an alpha-olefin having from 3 to about 18 carbon atoms, preferably from 4 to about 10 carbon atoms and most preferably 8 carbon atoms. The LLDPE for the outer layer 32 generally has a density of greater than 0.916 g/cm$^3$, more preferably from about 0.916 to about 0.935 g/cm$^3$, more preferably from about 0.918 to about 0.926 g/cm$^3$; generally has a melt index of from about 0.1 to about 10 g/10 minutes, preferably from about 0.5 to about 2 g/10 minutes, and generally has an $I_{10}/I_2$ ratio of from about 5 to about 20, preferably from about 7 to about 20. The thickness of the outer layer 32 may be any thickness so long as the seal layer 31 has a minimum thickness of about 0.1 mil (2.5 microns).

Another embodiment of the film structure 30 for the pouch of the present invention, shown in FIG. 4, comprises the polymeric layer 32 sandwiched between two polymeric seal layers 31.

Still another embodiment of the film structure 30 for the pouch of the present invention, shown in FIG. 5, comprises at least one polymeric core layer 33 between at least one polymeric outer layer 32 and at least one polymeric seal layer 31. The polymeric layer 33 may be the same LLDPE film layer as the outer layer 32 or preferably a different LLDPE, and more preferably an LLDPE, for example DOWLEX ™ 2049 (Trademark of and commercially available from The Dow Chemical Company) that has a higher density than the outer layer 32. The thickness of the core layer 33 may be any thickness so long as the seal layer 31 has a minimum thickness of about 0.1 mil (2.5 microns).

Yet another embodiment (not shown) of the film structure for the pouch of the present invention can be a structure including a seal layer 31 and another polyethylene film layer referred to hereinafter as "high pressure low-density polyethylene" ("LDPE"). The LDPE layer generally has a density of from about 0.916 to about 0.930 g/cm$^3$ and has a melt index of from about 0.1 to about 10 g/10 minutes. The thickness of the LDPE layer may be any thickness so long as the seal layer 31 has a minimum thickness of about 0.1 mil (2.5 microns).

Still another embodiment (not shown) of the film structure for the pouch of the present invention can be a structure including a seal layer 31 and a layer of EVA copolymer having a weight ratio of ethylene to vinyl acetate from 22:1 to 24:1 and a melt index of from 0.2 to 20 g/10 minutes. The thickness of the EVA layer may be any thickness so long as the seal layer 31 has a minimum thickness of about 0.1 mil (2.5 microns).

The ultimate film thickness of the final film product used for making the pouch of the present invention is from about 0.5 mil (12.7 microns) to about 10 mils (254 microns), preferably from about 1 mil (25.4 microns) to about 5 mils (127 microns); more preferably from about 2 mils (50.8 microns) to 4 mils (100 microns).

Additives, known to those skilled in the art, such as anti-block agents, slip additives, UV stabilizers, pigments and processing aids may be added to the polymers from which the pouches of the present invention are made.

As can be seen from the different embodiments of the present invention shown in FIGS. 3–5, the film structure for the pouches of the present invention has design flexibility. Different LLDPE can be used in the outer and core layers to optimize specific film properties such as film stiffness. Thus, the film can be optimized for specific applications such as for a vertical form, film and seal machine.

The polyethylene film structure used to make a pouch of the present invention is made by either the blown tube extrusion method or the cast extrusion method, methods well known in the art. The blown tube extrusion method is described, for example, in Modern Plastics Mid-October 1989 Encyclopedia Issue, Volume 66, Number 11, pages 264 to 266. The cast extrusion method is described, for example, in Modern Plastics Mid-October 1989 Encyclopedia Issue, Volume 66, Number 11, pages 256 to 257.

Embodiments of the pouches of the present invention, shown in FIGS. 1 and 2, are hermetically sealed containers filled with "flowable materials". By "flowable materials" it is meant, materials which are flowable under gravity or which may be pumped, but the term "flowable materials" does not include gaseous materials. The flowable materials include liquids for example milk, water, fruit juice, oil; emulsions for example ice cream mix, soft margarine; pastes for example meat pastes, peanut butter, preservers for example jams, pie fillings marmalade, jellies; doughs; ground meat for example sausage meat; powders for example gelatin powders, detergents, granular solids for example nuts, sugar; and like materials. The pouch of the present invention is particularly useful for liquid foods for example milk. The flowable material may also include oleaginous liquids for example, cooking oil or motor oil.

Once the film structure for the pouch of the present invention is made, the film structure is cut to the desired width for use in conventional pouch-forming machines. The embodiments of the pouch of the present invention shown in FIGS. 1 and 2 are made in so-called form, fill and seal machines well known in the art. With regard to FIG. 1, there is shown a pouch 10 being a tubular member 11 having a longitudinal lap seal 12 and transverse seals 13 such that, a "pillow-shaped" pouch is formed when the pouch is filled with flowable material.

With regard to FIG. 2, there is shown a pouch 20 being a tubular member 21 having a peripheral fin seal 22 along three sides of the tubular member 11, that is, the top seal 22a and the longitudinal side seals 22b and 22c, and having a bottom substantially concave or "bowl-shaped" member 23 sealed to the bottom portion of the tubular seal 21 such that when viewed in cross-section, longitudually, substantially a semi-circular or "bowed-shaped" bottom portion is formed when the pouch is filled with flowable material. The pouch shown in FIG. 2 is the so-called "Enviro-Pak" pouch known in the art.

The pouch manufactured according to the present invention is preferably the pouch shown in FIG. 1 made on so-called vertical form, fill and seal (VFFS) machines well known in the art. Examples of commercially available VFFS machines include those manufactured by Hayssen or Prepac. A VFFS machine is described in the following reference: F. C. Lewis, "Form-Fill-Seal," Packaging Encyclopedia, page 180, 1980.

In a VFFS packaging process, a sheet of the plastic film structure described herein is fed into a VFFS machine where the sheet is formed into a continuous tube in a tube-forming section. The tubular member is formed by sealing the longitudinal edges of the film together—either by lapping the plastic film and sealing the film using an inside/outside seal or by fin sealing the plastic film using an inside/inside seal. Next, a sealing bar seals the tube transversely at one end being the bottom of the "pouch", and then the fill material, for example milk, is added to the "pouch." The sealing bar then seals the top end of the pouch and either burns through the plastic film or cuts the film, thus, separating the formed completed pouch from the tube. The process of making a pouch with a VFFS machine is generally described in U.S. Pat. Nos. 4,503,102 and 4,521,437 incorporated herein by reference.

The capacity of the pouches of the present invention may vary. Generally, the pouches may contain from about 5 milliliters to about 10 liters, preferably from about 1 milliliter to about 8 liters, and more preferably from about 1 milliliter to about 5 liters of flowable material.

The film structure for the pouch of the present invention has precisely controlled strength. The use of the film structure described in the present invention for making a pouch results in a stronger pouch, and, therefore, more preferably, the pouch contains fewer use-related leakers. The use of the ULDPE seal layer of the present invention in a two or three-layer coextruded film product will provide a film structure that can be used for making pouches at a faster rate in the VFFS and such pouches produced will contain fewer leakers.

The pouches of the present invention have excellent performance results when tested by the Milk Pouch Drop Test and Step Stair Drop Test—tests which are defined herein. Under the Step Stair Drop Test, the pouches preferably have a "50% failure height" of greater than about 10 feet (3.0 m) and more preferably greater than about 13 feet (4 m). Under the Milk Pouch Drop Test, the pouches of the present invention preferably have a failure rate of less than about 10 percent and more preferably less than about 7 percent.

With the trend in today's consumer packaging industry moving toward providing the consumer with more environmentally friendly packages, the polyethylene pouch of the present invention is a good alternative. The use of the polyethylene pouch for packaging consumer liquids such as milk has its advantages over containers used in the past: the glass bottle, paper carton, and high density polyethylene jug. The previously used containers consumed large amounts of natural resources in their manufacture, required a significant amount of space in landfill, used a large amount of storage space and used more energy in temperature control of the product (due to the heat transfer properties of the container).

The polyethylene pouch of the present invention made of thin polyethylene film, used for liquid packaging, offers many advantages over the containers used in the past. The polyethylene pouch (1) consumes less natural resources, (2) requires less space in a landfill, (3) can be recycled, (4) can be processed easily, (5) requires less storage space, (6) uses less energy for storage (heat transfer properties of package), (7) can be safely incinerated and (8) can be reused, for example, the empty pouch can be used for other applications such as freezer bags, sandwich bags, and general purpose storage bags.

The following resins described in Table I were used to make blended and coextruded blown film samples described in the Examples and Comparative Examples:

TABLE I

| Resin Designation | Resin Type | Melt Index (g/10 minutes) | Density (g/cm$^3$) |
| --- | --- | --- | --- |
| Resin A | LDPE | 2.0 | 0.922 |
| Resin B | LLDPE | 0.75 | 0.921 |
| Resin C | LLDPE | 1.0 | 0.926 |
| Resin D | ULDPE | 1.0 | 0.912 |
| Resin E | ULDPE | 0.8 | 0.905 |

Erucamide, a slip agent; $SiO_2$, an antiblock agent; and a processing aid were added to each of the resins described in Table I such that the final concentrations of the additives were as follows: 1200 ppm Erucamide; 2500 ppm $SiO_2$ (4000 ppm for the ULDPE coextruded products); and 900 ppm processing aid. Film structures were made at 2 mil (50.8 microns) and 3 mil (76.2 microns) target thickness.

Film structures produced were subjected to physical testing to determine its various properties including:
(1) Puncture, using method ASTM D3763;
(2) Dart Impact, using ASTM D1709, Method A and Method B:
(3) Elmendorf Tear, using ASTM D1922;
(4) Tensiles, using ASTM D882;
(5) Gloss, using method ASTM D2457;
(6) Clarity, using method ASTM D1746;
(7) Coefficient of Friction, using method ASTM D1894;
(8) 2% Secant Modulus, using ASTM D882;
(9) Hot Tack Strength (only 3 mil (76.2 microns) films), using method described hereinbelow; and
(10) Heat Seal Strength (only 3 mil (76.2 microns) films), using method described hereinbelow;

The present invention is illustrated by the following examples but is not to be limited thereby.

Examples 1–4 and Comparative Examples A and B

Film samples described in Table II were made as a monolayer using a Macro blown film line. The extruder was 2-½ inches (6.4 cm) in diameter and had a 24:1 L/D and a barrier screw with a Maddock mixing head. A 6 inch (15.2 cm) diameter die was used with a 40 mil (1,016 microns) die gap for the manufacture of the test films.

TABLE II

Monolayer Films

| Example No. | Sample No. | Resin | Gauge (mil) |
|---|---|---|---|
| 1 | Sample 1A | Blend of Resin B (75%)/Resin D (25%) | 3 |
| 2 | Sample 1B | Blend of Resin B (75%)/Resin D (25%) | 2 |
| 3 | Sample 2A | Blend of Resin C (75%)/Resin D (25%) | 3 |
| 4 | Sample 2B | Blend of Resin C (75%)/Resin D (25%) | 2 |
| Comparative A | Comparative Sample 1A | Resin B | 3 |
| Comparative B | Comparative Sample 1B | Resin B | 2 |

The monolayer films shown in Table II were produced in the Macro blown film line using the following fabrication conditions:

2.5 blow-up ratio
216° C. melt temperature

The results of testing the above film samples are shown in Tables VI and VII.

Examples 5–24 and Comparative Examples C and D

The film samples described in Tables III, IV and V were produced using an Egan 3-layer coextrusion line. The fabrication conditions used in the production of the coextruded films was as follows:

2.5 blow-up ratio
216° C. melt temperature

The results of testing the above films samples are shown in Tables VI and VII.

Comparative films samples, Samples 2A and 2B, described in Table V were produced and tested using the same conditions and equipment as in Example 5–24 except that Comparative Samples 2A and 2B were blends and not multilayer coextruded films. The results of testing the comparative film samples are shown in Tables VI and VII.

Comparative Example E

Comparative Sample 3 in Table VI is SCLAIRFILM SM-3 film (herein SM-3 Film) commercially available from DuPont Canada. Two 24-centimeters diameter×38 centimeters×3 mil (76.2 microns) rolls of SM-3 Film were tested concurrently with the fabricated films of the present invention as in Examples 5–24. A publication by DuPont Canada discloses that SM-3 Film has a density of 0.918 g/cm$^3$.

TABLE III

2-Layer Coextrusion

| Example No. | Sample No. | Extruder A Inner | Extruder B Core | Extruder C Outer | Gauge (mil) |
|---|---|---|---|---|---|
| 5 | Sample 3A | Resin D (50%) | Resin B (25%) | Resin B (25%) | 3 |
| 6 | Sample 3B | Resin D (50%) | Resin B (25%) | Resin B (25%) | 2 |
| 7 | Sample 4A | Resin D (25%) | Resin B (37.5%) | Resin B (37.5%) | 3 |
| 8 | Sample 4B | Resin D (25%) | Resin B (37.5%) | Resin B (37.5%) | 2 |
| 9 | Sample 5A | Resin D (50%) | Resin C (25%) | Resin C (25%) | 3 |
| 10 | Sample 5B | Resin D (50%) | Resin C (25%) | Resin C (25%) | 2 |
| 11 | Sample 6A | Resin D (25%) | Resin C (37%) | Resin C (37%) | 3 |
| 12 | Sample 6B | Resin D (25%) | Resin C (37%) | Resin C (37%) | 2 |

TABLE IV

3-Layer Coextrusion

| Example No. | Sample No. | Extruder A Inner | Extruder B Core | Extruder C Outer | Gauge (mil) |
|---|---|---|---|---|---|
| 13 | Sample 7A | Resin D (20%) | Resin C (60%) | Resin B (20%) | 3 |
| 14 | Sample 7B | Resin D (20%) | Resin B (60%) | Resin B (20%) | 2 |
| 15 | Sample 8A | Resin D (33%) | Resin C (33%) | Resin B (33%) | 3 |
| 16 | Sample 8B | Resin D (33%) | Resin C (33%) | Resin B (33%) | 2 |
| 17 | Sample 9A | Resin E (20%) | Resin C (60%) | Resin B (20%) | 3 |
| 18 | Sample 9B | Resin E (20%) | Resin C (60%) | Resin B (20%) | 2 |
| 19 | Sample 10A | Resin E (33%) | Resin C (33%) | Resin B (33%) | 3 |
| 20 | Sample 10B | Resin E (33%) | Resin C (33%) | Resin B (33%) | 2 |
| 21 | Sample 11A | Resin D (20%) | Resin B (60%) | Resin D (20%) | 3 |
| 22 | Sample 11B | Resin D (20%) | Resin B (60%) | Resin D (20%) | 2 |
| 23 | Sample 12A | Resin D (33%) | Resin B (33%) | Resin D (33%) | 3 |
| 24 | Sample 12B | Resin D (33%) | Resin B (33%) | Resin D (33%) | 2 |

TABLE V

Blended Films

| Example No. | Sample No. | Extruder A Inner | Extruder B Core | Extruder C Outer | Gauge (mil) |
|---|---|---|---|---|---|
| Comparative C | Comparative Sample 2A | Blend of Resin B (85%)/Resin A (15%) | Blend of Resin B (85%)/Resin A (15%) | Blend of Resin B (85%)/Resin A (15%) | 3 |
| Comparative D | Comparative Sample 2B | Blend of Resin B (85%)/Resin A (15%) | Blend of Resin B (85%)/Resin A (15%) | Blend of Resin B (85%)/Resin A (15%) | 2 |

TABLE VI

Film Performance Data, 3 mil

| | Monolayer Structure | | | | 2-Layer Structure | | | |
|---|---|---|---|---|---|---|---|---|
| Property | 1A | 2A | Comparative 1A | Comparative 2A | 3A | 4A | 5A | 6A |
| Gauge, mil (microns) | | | | | | | | |
| Average | 3.18 (80.8) | 3.09 (78.5) | 3.23 (82.0) | 3.24 (82.3) | 3.28 (83.3) | 3.23 (82.0) | 3.29 (83.6) | 2.96 (75.2) |
| Range | 2.93–3.45 (74.4–87.6) | 2.84–3.39 (62.1–86.1) | 2.98–3.69 (75.7–93.7) | 3.18–3.35 (80.8–85.1) | 3.20–3.39 (81.3–86.1) | 3.11–3.45 (79.0–87.6) | 3.05–3.51 (77.5–89.2) | 2.90–3.02 (73.7–76.7) |
| Coefficient of Friction | | | | | | | | |
| Static: | | | | | | | | |
| inside/outside | 0.22 | 0.28 | 0.25 | 0.26 | 0.22 | 0.24 | 0.26 | 0.25 |
| outside/outside | | | | | 0.24 | 0.22 | | |
| inside/inside | | | | | 0.24 | 0.23 | | |
| Kinetic: | | | | | | | | |
| inside/outside | 0.17 | 0.18 | 0.18 | 0.19 | 0.19 | 0.18 | 0.20 | 0.20 |
| outside/outside | | | | | 0.20 | 0.19 | | |
| inside/inside | | | | | 0.17 | 0.17 | | |
| Clarity, percent | 26.2 | 37.3 | 31.5 | 11.6 | 13.7 | 24.1 | 30.4 | 36.6 |
| Gloss, percent | 63.9 | 62.6 | 60.9 | 62.2 | 62.5 | 62.1 | 60.6 | 61.6 |
| Elmendorf Tear, g | | | | | | | | |
| MD$^{(1)}$ | 1,539 | 1,234 | 1,391 | 1,175 | 1,638 | 1,595 | 1,480 | 1,146 |
| CD$^{(2)}$ | 2,001 | 1,687 | 1,900 | 1,911 | 1,862 | 1,818 | 1,731 | 1,549 |
| Dart Impact, g | | | | | | | | |
| Large Dart | 492 | | 374 | | 375 | 452 | 362 | |
| Small Dart | 584 | 459 | 516 | 420 | 516 | 603 | 519 | 420 |
| 2% Secant, psi (MPa) | | | | | | | | |
| MD$^{(1)}$ | 23947 (1651.1) | 29377 (2025.5) | 26647 (1837.3) | 25847 (1782.2) | 20477 (1411.9) | 22731 (1567.3) | 25620 (1567.3) | 29740 (2050.6) |
| CD$^{(2)}$ | 27379 (1887.8) | 33096 (2282.0) | 30668 (2114.6) | 27811 (1917.6) | 23428 (1615.4) | 27146 (1871.7) | 29915 (2062.6) | 34202 (2358.2) |
| Puncture, ft-lb$_f$/in$^3$(J/cm$^3$) | 16.2 (1.34) | 16.8 (1.39) | 16.7 (1.38) | 13.3 (1.10) | 12.8 (1.06) | 13.7 (1.13) | 13.3 (1.10) | 15.2 (1.26) |
| Tensile | | | | | | | | |
| Yield, psi (MPa) | | | | | | | | |
| MD | 1,461 (100.70) | 1,680 (115.84) | 1,633 (112.58) | 1,543 (106.38) | 1,319 (90.93) | 1,428 (98.46) | 1,525 (105.11) | 1,737 (119.79) |
| CD | 1,562 (107.67) | 1,865 (128.58) | 1,827 (126.00) | 1,581 (109.02) | 1,405 (96.85) | 1,552 (107.03) | 1,726 (118.98) | 1,919 (133.03) |
| Ultimate, psi (MPa) | | | | | | | | |
| MD | 5,676 (391.37) | 5,655 (389.88) | 5,713 (393.93) | 4,908 (338.41) | 5,456 (367.19) | 5,656 (389.99) | 6,042 (416.60) | 5,953 (410.48) |
| CD | 5,698 (392.86) | 5,314 (366.42) | 5,366 (370.01) | 4,610 (317.86) | 5,497 (379.02) | 5,711 (393.02) | 5,987 (412.77) | 5,603 (386.30) |
| Elongation, percent | | | | | | | | |
| MD | 692 | 965 | 963 | 914 | 944 | 936 | 1,004 | 978 |
| CD | 753 | 974 | 751 | 974 | 1,004 | 999 | 1,029 | 987 |
| Toughness Modulus, ft-lb$_f$/in$^3$ (J/cm$^3$) | | | | | | | | |
| MD | 1,360 (112.4) | 2,018 (166.9) | 2,163 (178.9) | 1,778 (147.0) | 1,744 (146.7) | 1,831 (151.4) | 2,103 (173.9) | 2,104 (174.0) |
| CD | 1,500 (124.1) | 1,969 (162.9) | 1,574 (130.2) | 1,753 (145.0) | 1,876 (155.2) | 1,962 (162.2) | 2,184 (180.6) | 2,072 (171.4) |

| | 3-Layer Structure | | | | | | |
|---|---|---|---|---|---|---|---|
| Property | 7A | 8A | 9A | 10A | 11A | 12A | Comparative Sample 3* |
| Gauge, mil (microns) | | | | | | | |
| Average | 3.22 (81.8) | 2.93 (74.4) | 2.83 (71.9) | 2.95 (74.9) | 3.39 (86.1) | 3.31 (84.1) | 3.17 (80.5) |
| Range | 3.18–3.35 (80.8–85.1) | 2.68–3.06 (68.1–77.7) | 2.77–2.93 (70.4–74.4) | 2.89–3.02 (73.4–76.7) | 3.10–3.55 (78.7–90.2) | 3.25–3.37 (88.9–85.6) | 2.90–3.34 (73.7–84.8) |
| Coefficient of Friction | | | | | | | |
| Static: | | | | | | | |
| inside/outside | 0.22 | 0.22 | 0.24 | 0.27 | 0.25 | 0.25 | 0.13 |
| outside/outside | 0.23 | 0.21 | 0.23 | 0.25 | 0.24 | 0.27 | 0.12 |
| inside/inside | 0.22 | 0.18 | 0.29 | 0.28 | 0.23 | 0.24 | 0.14 |
| Kinetic: | | | | | | | |
| inside/outside | 0.18 | 0.17 | 0.19 | 0.21 | 0.18 | 0.20 | 0.10 |
| outside/outside | 0.17 | 0.17 | 0.20 | 0.22 | 0.19 | 0.21 | 0.10 |
| inside/inside | 0.16 | 0.15 | 0.21 | 0.24 | 0.17 | 0.18 | 0.10 |
| Clarity, percent | 32.2 | 27.6 | 35.0 | 31.2 | 31.0 | 25.7 | 45.1 |
| Gloss, percent | 65.4 | 69.2 | 65.4 | 66.3 | 69.2 | 69.4 | 74.1 |
| Elmendorf Tear, g | | | | | | | |
| MD$^{(1)}$ | 1,285 | 1,402 | 1,184 | 1,354 | 1,798 | 1,711 | 758 |
| CD$^{(2)}$ | 1,690 | 1,578 | 1,585 | 1,651 | 1,997 | 1,943 | 1.248 |
| Dart Impact, g | | | | | | | |
| Large Dart | | | | 372 | 529 | 621 | 366 |

TABLE VI-continued

Film Performance Data, 3 mil

| | | | | | | | |
|---|---|---|---|---|---|---|---|
| Small Dart | 462 | 459 | 399 | 492 | >651 | >651 | 465 |
| 2% Secant, psi (MPa) | | | | | | | |
| MD[1] | 27431 | 23098 | 25428 | 23439 | 24874 | 22373 | 22800 |
| | (1891.4) | (1592.6) | (1753.3) | (1616.1) | (1715.1) | (1542.6) | (1572.1) |
| CD[2] | 30348 | 26283 | 31921 | 30288 | 29083 | 26883 | 25449 |
| | (2092.5) | (1812.2) | (2201.6) | (2088.4) | (2005.3) | (1853.6) | (1754.7) |
| Puncture, ft-lb$_f$/in$^3$ | 14.2 | 12.3 | 15.8 | 16.6 | 13.1 | 13.4 | 13.8 |
| (J/cm$^3$) | (1.17) | (1.02) | (1.31) | (1.37) | (1.08) | (1.11) | (1.14) |
| Tensile | | | | | | | |
| Yield, psi (MPa) | | | | | | | |
| MD | 1,664 | 1,463 | 1,575 | 1,486 | 1,428 | 1,374 | 1,558 |
| | (114.74) | (100.85) | (108.58) | (102.48) | (98.44) | (94.73) | (107.43) |
| CD | 1,837 | 1,608 | 1,763 | 1,617 | 1,623 | 1,506 | 1,524 |
| | (126.64) | (110.86) | (121.55) | (111.47) | (111.89) | (103.82) | (105.07) |
| Ultimate, psi (MPa) | | | | | | | |
| MD | 5,953 | 5,348 | 5,194 | 5,882 | 6,008 | 5,908 | 5,639 |
| | (410.45) | (368.77) | (358.13) | (405.58) | (414.26) | (407.37) | (388.82) |
| CD | 5,844 | 4,718 | 5,089 | 5,748 | 5,892 | 5,866 | 6,173 |
| | (402.95) | (325.27) | (350.91) | (396.31) | (406.28) | (404.44) | (425.65) |
| Elongation, percent | | | | | | | |
| MD | 989 | 924 | 927 | 927 | 998 | 971 | 761 |
| CD | 1,016 | 937 | 956 | 995 | 1,037 | 1,026 | 682 |
| Toughness Modulus, | | | | | | | |
| ft-lb$_f$/in$^3$(J/cm$^3$) | | | | | | | |
| MD | 2,083 | 1,750 | 1,759 | 1,869 | 2,039 | 1,951 | 1,562 |
| | (172.2) | (144.7) | (145.4) | (154.5) | (168.7) | (161.3) | (129.1) |
| CD | 2,130 | 1,665 | 1,819 | 2,000 | 2,144 | 2,046 | 1,569 |
| | (176.1) | (137.7) | (150.4) | (165.4) | (177.3) | (169.2) | (129.8) |

[1]MD = machine direction
[2]CD = cross direction
*SM-3 Film Commerically available from DuPont Canada

TABLE VII

Film Performance Data, 2 mil

| | Monolayer Structure | | | | 2-Layer Structure | | | |
|---|---|---|---|---|---|---|---|---|
| Property | 1B | 2B | Comparative 1B | Comparative 2B | 3B | 4B | 5B | 6B |
| Gauge, mil (micron) | | | | | | | | |
| Average | 2.11 | 2.08 | 2.01 | 2.14 | 2.11 | 1.97 | 2.08 | 2.00 |
| | (53.6) | (52.8) | (51.1) | (54.4) | (53.6) | (50.0) | (52.8) | (50.8) |
| Range | 1.88-2.3 | 1.91-2.42 | 1.78-2.18 | 2.06-2.34 | 1.92-2.15 | 1.90-2.01 | 2.04-2.13 | 1.91-2.05 |
| | (47,8-58.9) | (48.5-61.5) | (45.2-55.4) | (52.3-59.4) | (48.8-54.6) | (48.3-51.1) | (51.8-54.1) | 48.5-52) |
| Clarity, percent | 27.0 | 40.1 | 26.5 | 17.7 | 22.5 | 28.1 | 32.6 | 34.7 |
| Gloss, percent | 64.7 | 63.1 | 54.5 | 64.7 | 67.7 | 67.4 | 60.1 | 59.5 |
| Elmendorf Tear, g | | | | | | | | |
| MD[1] | 963 | 817 | 832 | 653 | 956 | 882 | 945 | 707 |
| CD[2] | 1,341 | 1,174 | 1,277 | 1,363 | 1,235 | 1,148 | 1,162 | 1,094 |
| Dart Impact, Small Dart, g | 465 | 317 | 327 | 273 | 405 | 417 | 339 | 294 |
| 2% Secant, psi (MPa) | | | | | | | | |
| MD | 24276 | 27506 | 27088 | 26483 | 20396 | 22959 | 25582 | 30418 |
| | (1673.6) | (1896.3) | (1867.4) | (1825.7) | (1406.1) | (1582.8) | (1763.6) | (2097.0) |
| CD | 27077 | 32326 | 31375 | 29419 | 23421 | 27135 | 30813 | 36867 |
| | (1866.7) | (2228.6) | (2163.0) | (2028.1) | (1614.6) | (1870.7) | (2124.2) | (2541.6) |
| Puncture, ft-lb$_f$/in$^3$ | 16.3 | 18.7 | 19.3 | 10.6 | 15.4 | 15.2 | 14.0 | 13.7 |
| (J/cm$^3$) | (1.34) | (1.55) | (1.60) | (0.88) | (1.27) | (1.26) | (1.16) | (1.13) |
| Tensile | | | | | | | | |
| Yield, psi (MPa) | | | | | | | | |
| MD[1] | 1,492 | 1,619 | 1,671 | 1,583 | 1,288 | 1,408 | 1,546 | 1,771 |
| | (102.87) | (111.63) | (115.16) | (109.10) | (88.77) | ((97.10) | (106.55) | (122.11) |
| CD[2] | 1,550 | 1,804 | 1,746 | 1,705 | 1.369 | 1,490 | 1,671 | 2,074 |
| | (106.85) | (124.37) | (120.37) | (117.53) | (96.23) | (102.71) | (115.18) | (142.96) |
| Ultimate, psi (MPa) | | | | | | | | |
| MD | 5,710 | 5,779 | 5,588 | 5,138 | 5,403 | 5,345 | 5,804 | 5,443 |
| | (393.62) | (398.40) | (385.26) | (354.23) | (372.51) | (368.47) | (400.11) | (375.24) |
| CD | 4,775 | 4,919 | 4,164 | 4,975 | 4,647 | 4,775 | 4,945 | 5,186 |
| | (329.17) | (339.10) | (287.04) | (342.99) | (320.37) | (329.17) | (340.92) | (357.49) |
| Elongation, percent | | | | | | | | |
| MD | 843 | 651 | 625 | 824 | 859 | 822 | 910 | 863 |
| CD | 926 | 666 | 663 | 956 | 911 | 897 | 936 | 895 |
| Toughness Modulus, | | | | | | | | |
| ft-lb$_f$/in$^3$(J/cm$^3$) | | | | | | | | |
| MD | 1,682 | 1,316 | 1,293 | 1,731 | 1,580 | 1,525 | 1,857 | 1,775 |
| | (139.1) | (108.8) | (106.9) | (143.2) | (130.6) | (126.1) | (153.6) | (146.8) |
| CD | 1,728 | 1,249 | 1,149 | 1,837 | 1,548 | 1,549 | 1,737 | 1,853 |

TABLE VII-continued

Film Performance Data, 2 mil

|  | (142.9) | (103.3) | (95.0) | (151.9) | (128.0) | (128.1) | (143.6) | (153.3) |
|---|---|---|---|---|---|---|---|---|
|  |  |  | 3-Layer Structure |  |  |  |  |  |
| Property |  | 7B | 8B | 9B | 10B | 11B | 12B |  |
| Gauge, mil (micron) |  |  |  |  |  |  |  |  |
| Average |  | 2.08 | 2.12 | 2.09 | 2.04 | 2.14 | 2.21 |  |
|  |  | (52.8) | (53.8) | (53.1) | (51.8) | (54.4) | (56.1) |  |
| Range |  | 2.02–2.17 | 2.09–2.14 | 2.07–2.14 | 2.01–2.08 | 2.02–2.27 | 2.01–2.29 |  |
|  |  | (51.3–55.1) | (53.1–54.4) | (52.6–54.4) | (51.1–52.8) | (51.3–57.7) | (51.1–58.2) |  |
| Clarity, percent |  | 34.1 | 28.2 | 35.0 | 34.6 | 27.5 | 26.2 |  |
| Gloss, percent |  | 70.2 | 72.2 | 70.9 | 66.3 | 67.3 | 69.4 |  |
| Elmendorf Tear, g |  |  |  |  |  |  |  |  |
| MD[1] |  | 896 | 915 | 851 | 787 | 1,030 | 1.157 |  |
| CD[2] |  | 1,220 | 1,112 | 1,079 | 1,143 | 1,267 | 1,385 |  |
| Dart Impact, Small Dart, g |  | 315 | 345 | 285 | 390 | 483 | 519 |  |
| 2% Secant, psi (MPa) |  |  |  |  |  |  |  |  |
| MD |  | 27421 | 23854 | 29097 | 25967 | 23163 | 22977 |  |
|  |  | (1890.4) | (1644.5) | (2005.9) | (1790.2) | (1569.9) | (1584.0) |  |
| CD |  | 29076 | 28520 | 32290 | 30064 | 27064 | 25982 |  |
|  |  | (2004.5) | (1966.2) | (2226.1) | (2072.6) | (1865.8) | (1791.2) |  |
| Puncture, ft-lb$_f$/in$^3$ |  | 16.7 | 15.6 | 17.5 | 18.7 | 14.7 | 14.3 |  |
| (J/cm$^3$) |  | (1.38) | (1.29) | (1.45) | (1.55) | (1.22) | (1.18) |  |
| Tensile |  |  |  |  |  |  |  |  |
| Yield, psi (MPa) |  |  |  |  |  |  |  |  |
| MD[1] |  | 1,569 | 1,515 | 1,575 | 1,508 | 1,427 | 1,374 |  |
|  |  | (108.15) | (104.44) | (108.59) | (103.95) | (98.36) | (94.71) |  |
| CD[2] |  | 1,848 | 1.628 | 1.681 | 1.589 | 1.576 | 1,456 |  |
|  |  | (127.40) | (112.21) | (115.87) | (109.53) | (108.66) | (100.40) |  |
| Ultimate, psi (MPa) |  |  |  |  |  |  |  |  |
| MD |  | 5,557 | 5,006 | 4,721 | 5,371 | 5,546 | 5,632 |  |
|  |  | (383.07) | (345.11) | (325.49) | (370.30) | (382.33) | (388.28) |  |
| CD |  | 5.036 | 4,532 | 4,616 | 5,194 | 5,209 | 4,977 |  |
|  |  | (347.17) | (312.42) | (318.25) | (358.07) | (359.07) | (343.14) |  |
| Elongation, percent |  |  |  |  |  |  |  |  |
| MD |  | 916 | 857 | 805 | 815 | 895 | 874 |  |
| CD |  | 919 | 907 | 900 | 914 | 939 | 949 |  |
| Toughness Modulus, |  |  |  |  |  |  |  |  |
| ft-lb$_f$/in$^3$(J/cm$^3$) |  |  |  |  |  |  |  |  |
| MD |  | 1,803 | 1,581 | 1,436 | 1,539 | 1,721 | 1,695 |  |
|  |  | (149.1) | (130.8) | (118.7) | (127.3) | (149.5) | (70.1) |  |
| CD |  | 1,795 | 1,596 | 1,582 | 1,697 | 1,766 | 1,696 |  |
|  |  | (148.4) | (132.0) | (130.9) | (140.4) | (146.6) | (0.0) |  |

[1]MD = machine direction
[2]CD = cross direction

Film Performance Tests Results

In liquid packaging, the pouches may be subjected to a wide variety of abuses. These include dropping of the pouch on the floor, dropping objects onto the pouch, picking the pouch up from one end and poking it with fingers or other objects. Performance Tests—puncture, dart drop test, Elmendorf tear and tensile—are intended to duplicate the type of abuse that the pouches would encounter during normal use. In general, the properties of the film structure for the pouches of the present invention were as good, and in some cases better than, the properties of prior art films.

For example, in the puncture test, of the 3 mil (76.2 microns) films that were tested, Sample 2A, Comparative Sample 1A and Sample 10A had the highest puncture resistance. Of the 2-mil (50.8 microns) gauge films, Comparative Sample 1B had the highest puncture resistance, followed by Sample 10B.

In the Elmendorf Tear test, however, it was unexpectedly found that some prior art films performed poorly in the Elmendorf tear tests, while the coextruded films with ULDPE in one of the layers performed well. The films made with LLDPE either coextruded or monolayer, typically had tear values less than the coextruded films with ULDPE in one of the layer.

The coefficient of friction (COF) property of the films generally ranged from 0.10 to 0.30.

In order for a film to properly move over the forming collars in a vertical form, fill and seal machine, the film is required to have a specific COF range. If the COF is high, the film may be too tacky for the VFFS to pull the film over the forming collar. If the COF is low, the film may be too slippery and the pull belts may not be able to grip the film to pull it. The process of coextrusion advantageously allows for varying slip properties between the inside and outside of the film by varying the slip concentration in the independent film layers.

The "2% secant modulus" property of the film structures is a measure of film stiffness. The stiffness of the film structures (2% secant modulus) is measured according to the method of ASTM-D882.

A specific amount of stiffness in a film is required for use of the film for producing pouches. If too much stiffness is present in the film, the film could experience too much fold when pulled over the edge of the forming collar and forming tube of a VFFS. Excessive stiffness can cause the film to "hang-up" in the VFFS. On the other hand, if enough stiffness is not present in the film consumer problems are inevitable. For example, in milk packaging, a pouch is usually placed inside of a support container which holds the pouch upright with approximately 2-½ inches (6 cm) to 3-½ inches (9 cm) of the pouch remaining above the container. To open the pouch, the corner is cut with a pair of scissors. If the film does not have enough stiffness (or wall strength), the film wall could collapse while the consumer is pouring the liquid from the pouch.

The film structures for the pouches of the present invention advantageously have precisely controlled stiffness which is required for the film structure to run through a VFFS. Generally, the stiffness of the film structure of the present invention is from about 1,400 MPa machine direction (MD)/1600 MPa cross direction (CD) to about 2,100 MPa MD/2,500 MPa CD and preferably from about 1,412 MPa MD/1,615 MPa CD to about 2,050 MPa MD/2,358 MPa CD. If the film lacks stiffness, the film may become "bunched" in the corners of the VFFS unit. If the film is too stiff, the film will not bend properly for the sealing of longitudinal edges.

Advantageously, the stiffness of the structure can be changed by using different polyethylene layers. For example, it was found that by varying the amount of the higher density resin, for example Resin C (LLDPE having a density of 0.926) used in the core layer of the coextruded films, the stiffness of the film could be altered. For example, film Sample 7A had a MD 2% secant value of 1,891 MPa and film Sample 8A had a MD 2% secant value of 1,593 MPa.

The above Examples illustrates that the use of ULDPE as the sealing layer in a film structure for the pouch of the present invention allows for the development of a designed structure with the appropriate amount of tear resistance, dart impact resistance, elongation and stiffness (2% secant).

Example 25—Hot Tack Strength

The hot tack strength of the 3 mil (76.2 microns) films was measured using the "DTC Hot Tack Test Method." The "DTC Hot Tack Test Method" is a test method which measures the force required to separate a heat seal before the seal has had a chance to fully cool (crystallize). This simulates the filling of material into a pouch before the seal has had a chance to cool.

The "DTC Hot Tack Test Method" is a test method using a DTC Hot Tack Tester Model #52D according to the following conditions:
Specimen Width: 25.4 mm
Sealing Time: 0.5 seconds
Sealing Pressure: 0.27N/mm/mm
Delay Time: 0.5 seconds
Peel Speed: 150 mm/second
Number of Samples/Temperature: 3
Temperature Increments: 5° C.
Temperature Range: 70° C.–130° C.

The hot tack results for the individual films may be found in Table VIII.

TABLE VIII

Hot Tack Seal Initiation Temperature and Hot Tack Strength

| Sample No. | Hot Tack Seal Initiation Temperature (°C.) | Temperature at Maximum Hot Tack Strength (°C.) | Maximum Hot Tack Strength, N/inch (N/m) |
|---|---|---|---|
| Sample 1A | 98 | 120 | 3.3(130) |
| Sample 2A | 105 | 120 | 3.1(122) |
| Comparative Sample 1A | 102.5 | 115 | 3.4(134) |
| Comparative Sample 2A | 102 | 115 | 3.5(138) |
| Sample 3A | 86 | 115 | 3.2(126) |
| Sample 4A | 86.5 | 115 | 3.4(134) |
| Sample 5A | 87 | 115 | 2.9(114) |
| Sample 6A | 88.5 | 105 | 3.1(122) |
| Sample 7A | 86.5 | 105 | 3.7(146) |
| Sample 8A | 86 | 105 | 3.3(130) |
| Sample 9A | 76.5 | 105 | 3.4(134) |
| Sample 10A | 76.5 | 105 | 3.3(130) |
| Sample 11A | 87 | 105 | 3.4(134) |
| Sample 12A | 87 | 105 | 3.2(126) |
| Comparative Sample 3 | 104.5 | 120 | 3.6(142) |

The "Maximum Hot Tack Strength" (maximum hot tack seal force) of the films and the temperature at which the Maximum Hot Tack Strength of the films occurs is shown in Table VIII.

The "Hot Tack Seal Initiation Temperature" ("Hot Tack $T_i$") shown in Table VIII is the lowest temperature at which a seal is formed. A seal force of 1.0N/inch (39.4N/m) was selected as the force required to form an adequate seal, and therefore, Hot Tack $T_i$ is found at a force of 1.0N/inch (39.4N/m).

A low Hot Tack $T_i$ and a broad heat seal range is important for VFFS packaging. A low initiation temperature and a broad heat seal range allows the VFFS machine to run at faster line speeds by allowing the sealing jaws of the VFFS to close for short periods of time while still obtaining an adequate heat seal.

The Hot Tack $T_i$ for 3 mil (76.2 microns) films in Table VIII shows that the coextruded films with Resin E in the seal layer showed the lowest Hot Tack $T_i$(76.5° C.) followed by films with Resin D in the sealing layer (86° C.).

The 3-layer and 2-layer coextruded films with an ULDPE in the sealing layer had the lowest temperature (105° C.) at which the highest hot tack strength was achieved.

Figure 6:
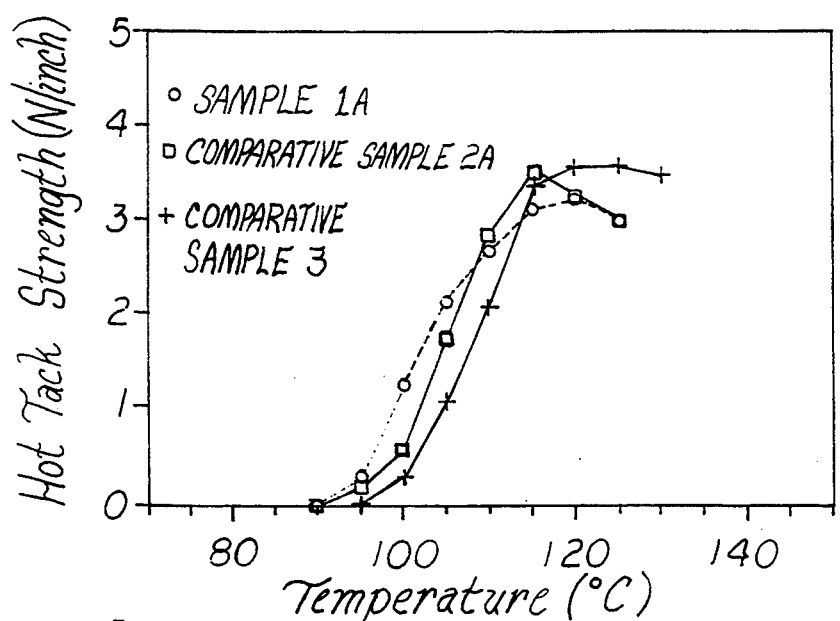
FIGS. 6–8 are graphical illustrations of hot tack strength of various film structures versus temperature.
Figure 7:
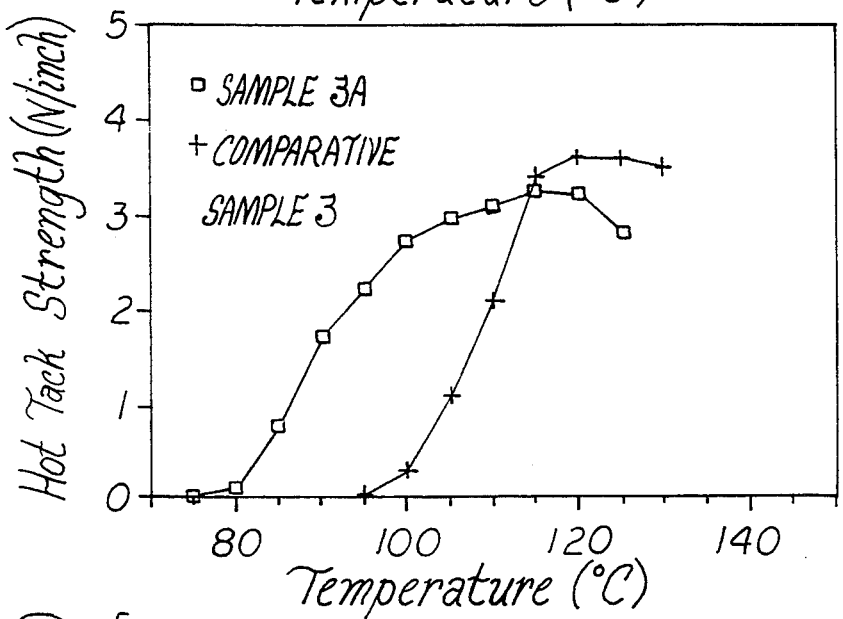
Figure 8:
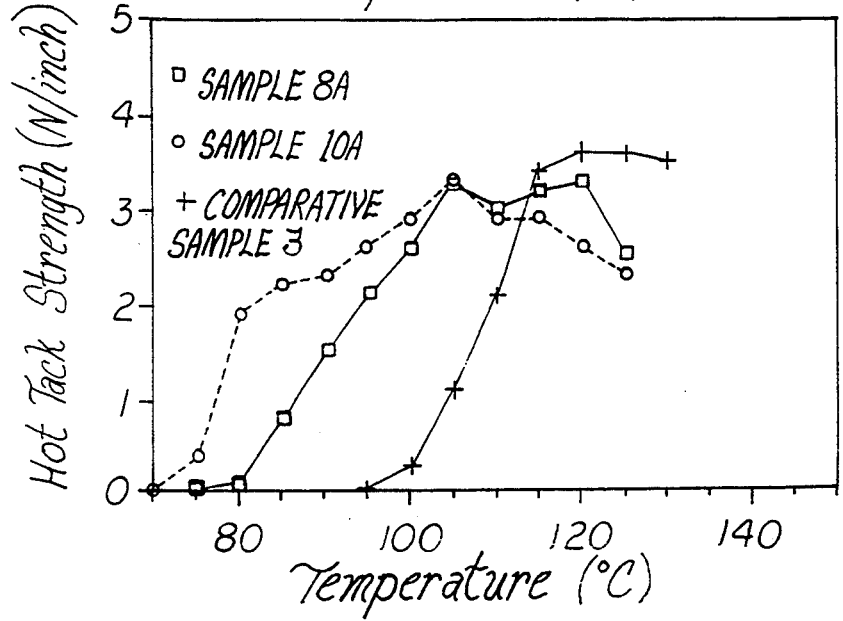

FIGS. 6–8 illustrate the Hot Tack Seal Initiation Temperature and the temperature at which the maximum Hot Tack Strength was achieved for various film samples. The temperature between Hot Tack $T_i$ and the temperature of maximum Hot Tack Strength indicates the size of the hot tack sealing range. FIGS. 6–8 shows that films with ULDPE as the sealing layer have a much larger sealing range than the LLDPE and/or LLDPE/LDPE blend films.

Example 26—Hot Tack Strength versus Sealing Time

This Example was carried out using the DTC Hot Tack Test Method described in Example 25 except that the temperature was held constant at 110° C. and the sealing time was varied from 0.1 second to 1 second. Only 3 mil (76.2 microns) films were tested.

The conditions used on the DTC Hot Tack Tester Model #52D were as follows:
Specimen Width: 25.4 mm
Sealing Time: varied
Delay Pressure: 0.27N/mm/mm
Peel Speed: 150 mm/second
Number of Samples/Time: 3
Sealing Time Range: 0.1 second to 1 second
Temperature: 110° C.

The results of the Hot Tack Strength for the various films are found in Table IX.

TABLE IX

Sample Number
Hot Tack Strength, N/inch (N/m)

| Seal Time (s) | Comparative Sample 2A | Comparative Sample 3 | Sample 1A | Sample 3A | Sample 8A | Sample 10A | Sample 12A |
|---|---|---|---|---|---|---|---|
| 0.0 | | | | | | | |
| 0.1 | 0.17 (6.7) | 0.30 (11.8) | 0.68 (26.8) | 2.07 (81.6) | 2.21 (87.1) | 2.92 (115) | 2.37 (93.4) |
| 0.2 | 0.58 (22.9) | 0.85 (33.5) | 1.74 (69.6) | 2.75 (108) | 3.03 (119) | 3.04 (120) | 2.89 (114) |
| 0.4 | 1.89 (74.5) | 1.46 (70.9) | 2.46 (96.9) | 2.89 (114) | 3.07 (121) | 3.06 (121) | 3.26 (128) |
| 0.6 | 2.40 (94.6) | 1.80 (70.9) | 2.52 (99.3) | 3.06 (121) | 3.23 (127) | 3.12 (123) | 3.15 (124) |
| 0.8 | 2.23 (87.9) | 1.97 (77.6) | 2.57 (101) | 3.17 (125) | 3.32 (131) | 3.30 (130) | 3.28 (129) |
| 1.0 | 2.36 (93.0) | 1.99 (78.4) | 2.55 (100) | 3.15 (124) | 3.39 (134) | 3.39 (134) | 3.25 (128) |

Tables VIII and IX show that films made with ULDPE in the sealing layer have higher hot tack strengths for shorter sealing times than the comparative samples tested at 110° C.

Figure 9:
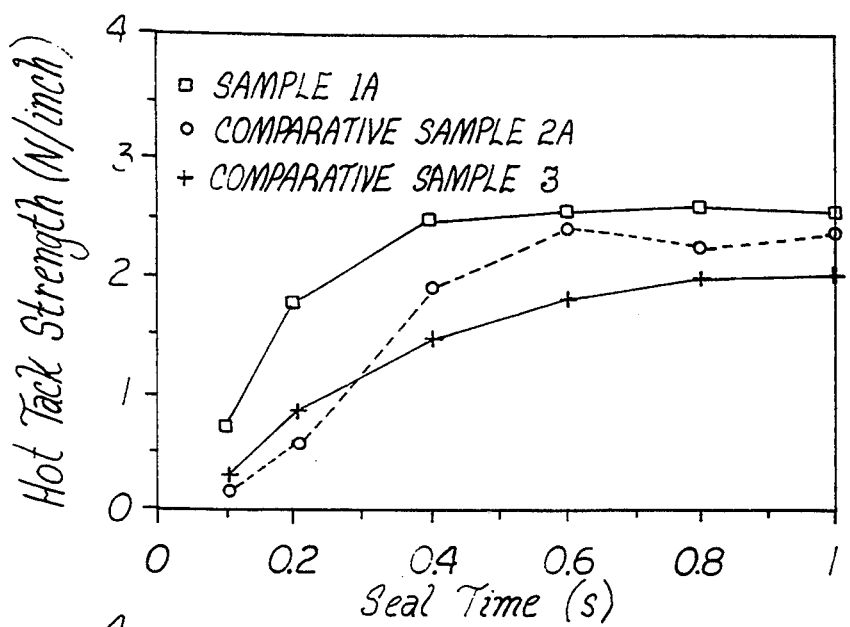
FIGS. 9–11 are graphical illustrations of hot tack strength of various film structures versus sealing time.
Figure 10:
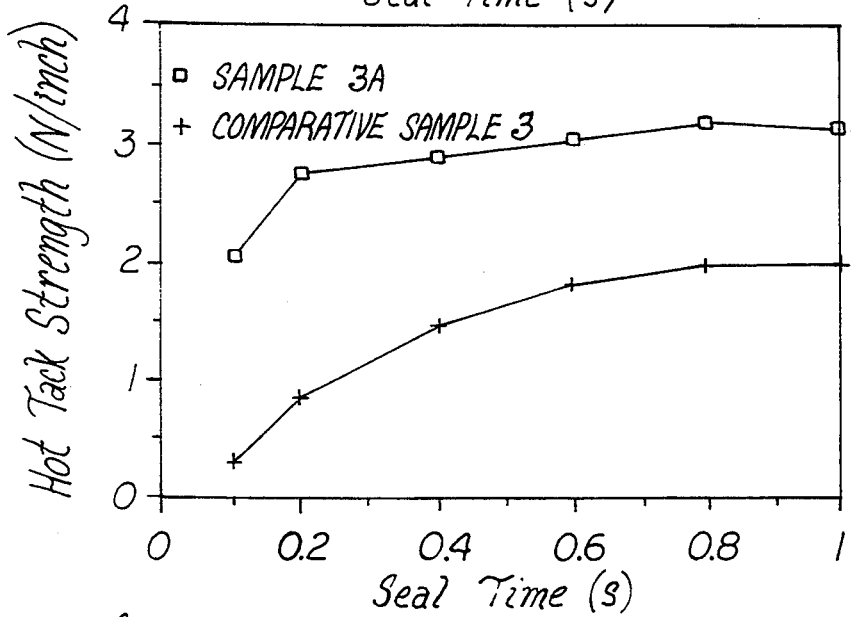
Figure 11:
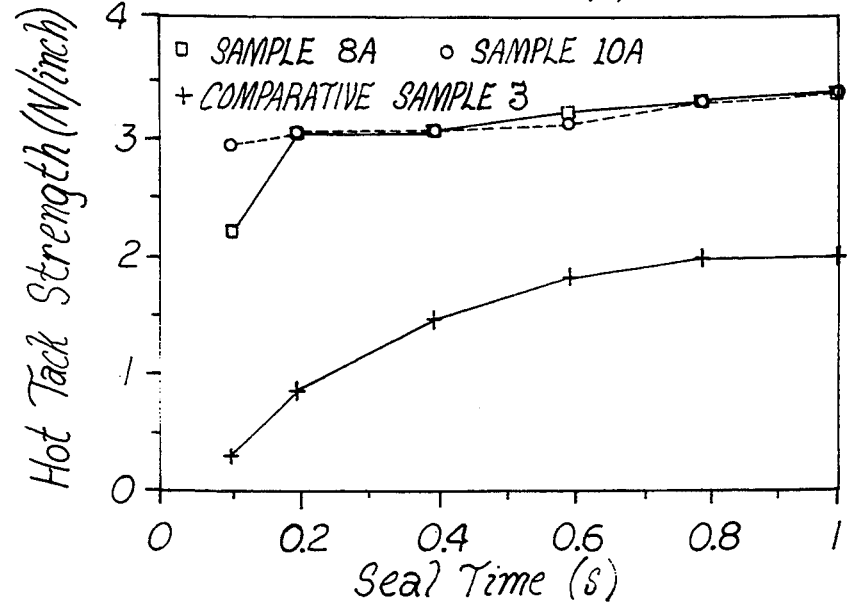

The data of Table IX is shown specifically in FIGS. 9 to 11.

Example 27—Heat Seal Strength

The heat seal strength of the 3 mil (76.2 microns) films was measured using the "DTC Heat Seal Strength Test Method." The "Heat Seal Strength Test Method" is a test method which measures the force required to separate a seal after the material has cooled to 23° C. temperature. The film samples were exposed to a relative humidity of 50 percent and a temperature of 23° C. for a minimum of 24 hours prior to testing.

The "DTC Heat Seal Strength Test Method" is a test method using a DTC Hot Tack Tester Model #52D, wherein the heat seal portion of the tester is used, according to the following conditions:
Specimen Width: 25.4 m
Sealing Time: 0.5 seconds
Sealing Pressure: 0.27N/mm/mm
Number of Samples/Temperature: 3
Temperature Increments: 10° C.
Temperature Range: 70° C. –140° C.

The seal strength of the film samples was determined using an Instron Tensile Tester Model #1122 according to the following test conditions:
Direction of Pull: 90° to seal
Crosshead Speed: 500 mm/minute
Full Scale Load: 5 kg
Number of Samples/Threshold: 31 percent of FSL
Break Criterion: 80 percent
Gauge Length: 2.0 inches (50.8 millimeters)
Sample Width: 1.0 inch (25.4 millimeters)

The monolayer films were tested inside/inside, while the coextruded films were tested inside/inside and inside/outside.

The heat seal results for the individual films are found in Table X.

TABLE X

Heat Seal Initiation Temperature and Maximum Heat Seal Strength

| | Inside/Inside | | | Inside/Outside | | |
|---|---|---|---|---|---|---|
| Sample No. | Initiation Temperature (°C.) | Temperature at Maximum Heat Seal Strength (°C.) | Maximum Heat Seal Strength, lbf/inch (N/m) | initiation Temperature (°C.) | Temperature at Maximum Heat Seal Strength (°C.) | Maximum Heat Seal Strength, lbf/inch (N/m) |
| Sample 1A | 104 | 130 | 6.33(1,108) | | | |
| Sample 2A | 103.5 | 130 | 6.26(1,096) | | | |
| Comparative Sample 1A | 109.5 | 130 | 6.30(1,103) | | | |
| Comparative Sample 2A | 110 | 140 | 7.91(1,385) | | | |
| Sample 3A | 95 | 140 | 5.87(1,028) | 105.5 | 140 | 6.57(1,151) |
| Sample 4A | 104.5 | 140 | 6.01(1,053) | 106.5 | 130 | 6.56(1,149) |
| Sample 5A | 95.5 | 130 | 5.92(1,037) | 106 | 130 | 5.94(1,040) |
| Sample 6A | 95.5 | 130 | 6.12(1,012) | 110 | 140 | 6.68(1,170) |
| Sample 7A | 94 | 130 | 6.40(1,121) | 103.5 | 140 | 6.32(1,107) |
| Sample 8A | 96.5 | 130 | 6.04(1,058) | 102 | 140 | 6.45(1,130) |
| Sample 9A | 82.5 | 90 | 5.89(1,032) | 102 | 140 | 4.99(874) |
| Sample 10A | 82.5 | 90 | 6.35(1,112) | 85.5 | 130 | 4.64(813) |
| Sample 11A | 97 | 130 | 6.27(1,098) | | | |
| Sample 12A | 101.5 | 130 | 6.17(1,081) | | | |
| Comparative Sample 3 | 103.5 | 140 | 8.20(1,436) | | | |

The "Maximum Heat Seal Strength" (maximum heat seal force) of the film samples and the temperature at which the Maximum Heat Seal Strength of the films occurs is shown in Table X.

The "Heat Seal Initiation Temperature" ("Heat Seal $T_i$") shown in Table X is the lowest temperature at which a seal is formed. A seal force of 1.0 lbf/inch (175N/m) was selected as the force required to form an adequate seals and therefore, Heat Seal $T_i$ is found at a force of 1.0 lb/in (175N/m).

A low Heat Seal $T_i$ and a broad heat seal range is important for VFFS packaging. A low initiation temperature and a broad heat seal range allows the VFFS machine to run at faster line speeds by allowing the sealing jaws of the VFFS to close for short periods of time while still obtaining an adequate heat seal.

Figure 12:
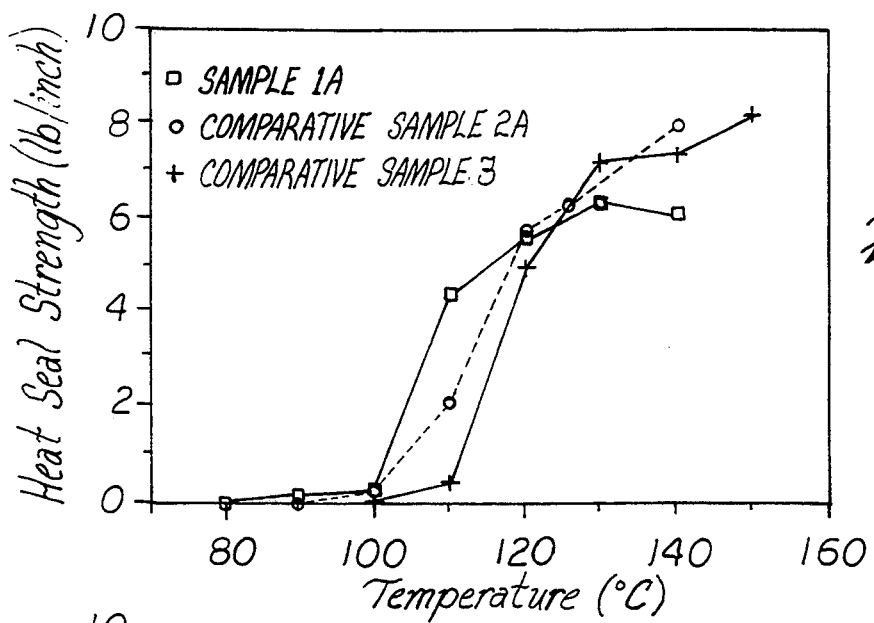
FIGS. 12–14 are graphical illustrations of heat seal strength of various film structures versus temperature.
Figure 13:
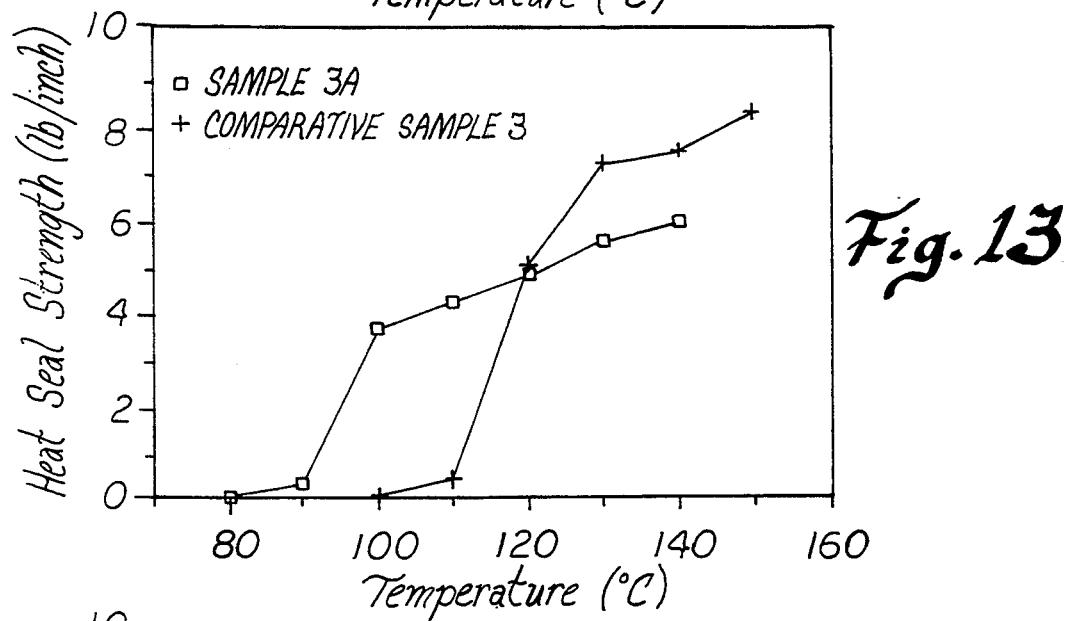
Figure 14:
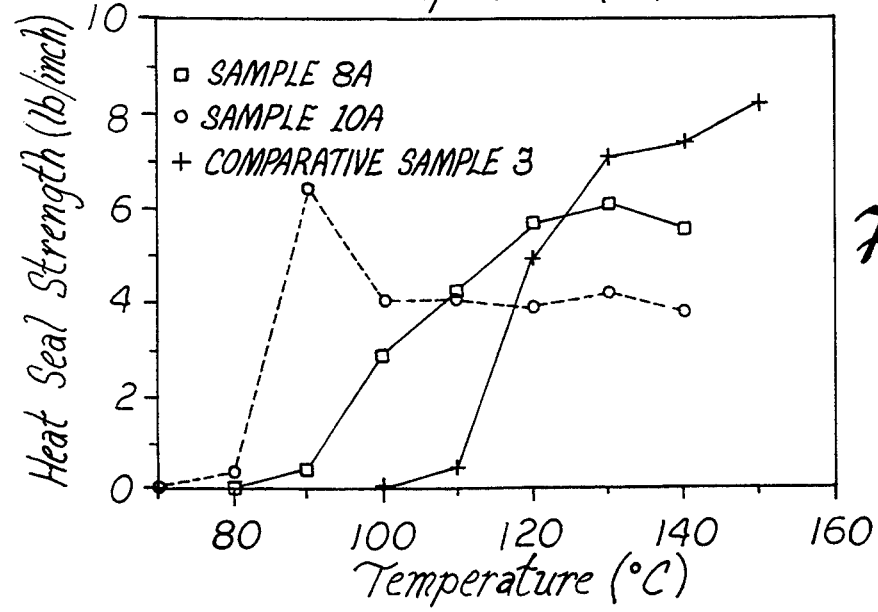
Figure 15:
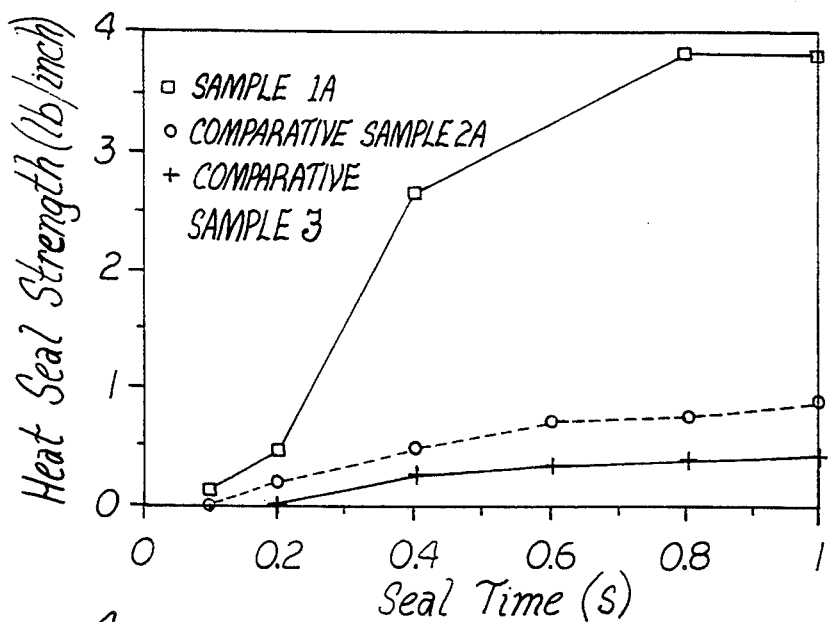
FIGS. 15–17 are graphical illustrations of heat seal strength of various film structures versus sealing time.
Figure 16:
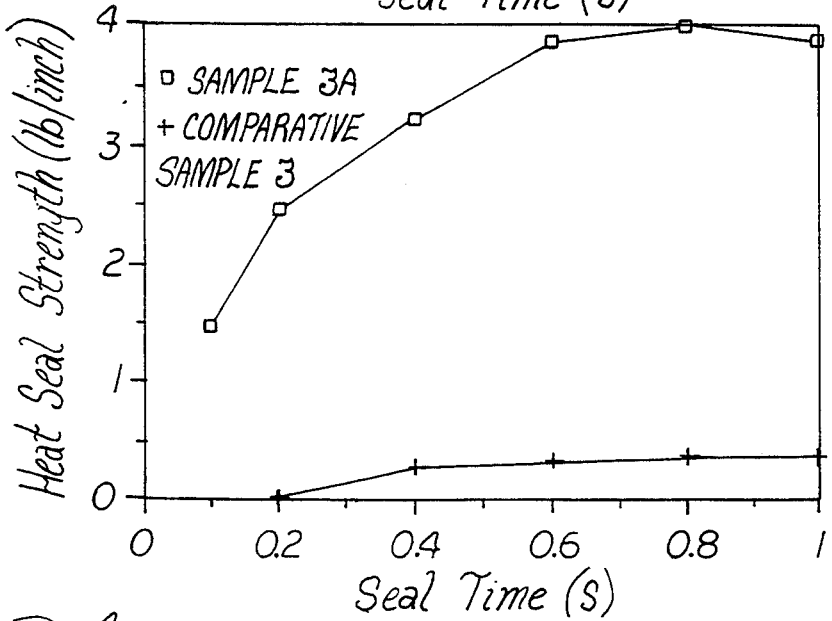
Figure 17:
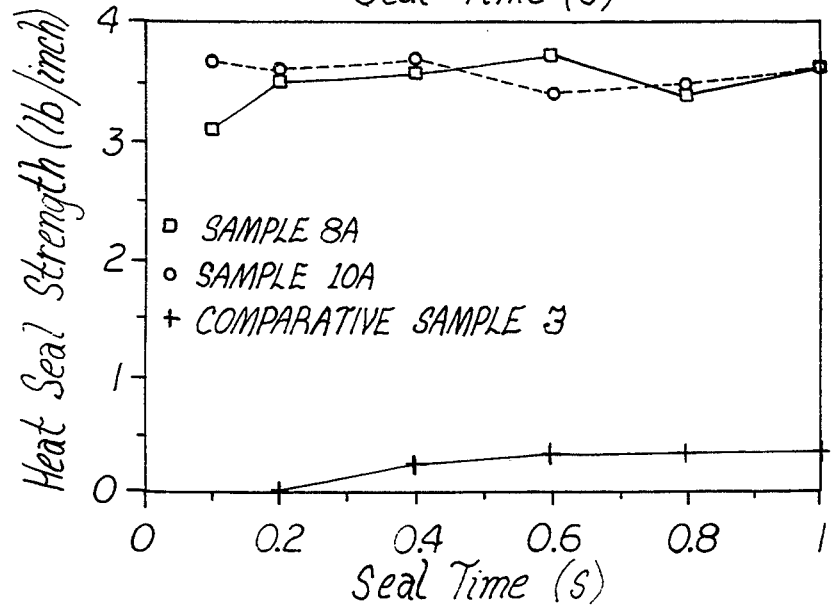

The monolayer films and most of the coextruded films have a smooth heat seal curve as shown in FIGS. 12–14; however, the films with higher concentrations of ULDPE in the sealing layer appeared to have two maximum sealing temperatures. It is believed that these two peaks are the maximum sealing forces achieved for the ULDPE layer and the LLDPE layer. As the heat is applied to the film, the ULDPE layer beings to form a seal at lower temperatures than the LLDPE (Heat Seal $T_i$ of 82.5° C. vs. 111° C.). As more heat is applied to the seal, the ULDPE layer reaches its maximum sealing temperature and strength. This phenomenon occurs below the Heat Seal $T_i$ for the LLDPE film. After the maximum sealing temperature has been achieved, the sealing strength drops and then it increases reaching a maximum at the same temperature that the LLDPE film does.

As expected, based on the hot tack results, the films with Resin E in the sealing layer had the lowest Heat Seal $T_i$ and the LLDPE had the highest Heat Seal $T_i$. The Heat Seal $T_i$ results were very similar to the Hot Tack $T_i$ results.

Example 28—Heat Seal Strength versus Sealing Time

This Example was carried out using the DTC Hot Seal Test Method described in Example 27 except that the temperature was held constant at 110° C. and the sealing time was varied from 0.1 second to 1 second. Only 3 mil (76.2 microns) films were tested.

The heat seal portion of the DTC Hot Tack #52D Tester Model was used. The conditions on the DTC Hot Tack Tester Model #52D were as follows:
Specimen Width: 25.4 m
Sealing Time: varied
Sealing Pressure: 0.27N/mm/mm
Number of Samples/Time: 4
Sealing Time Range: 0.1 second to 1 second
Temperature: 110° C.

The seal strength was determined using an Instron Tensile Tester Model No. 1122. The film samples were exposed to a relative humidity of 50 percent and a temperature of 23° C. for a minimum of 24 hours prior to testing. The following were the test conditions:
Direction of Pull: 90° to seal
Crosshead Speed: 500 mm/minute
Full Scale Load: 5 kg
Threshold: 1 percent of FSL
Break Criterion: 80 percent
Gauge Length: 2.0 inches (50.8 mm)
Sample Width: 1.0 inch (25.4 m)

The results of the heat seal force for various films are found in Table XI.

TABLE XI

| Seal Time (s) | Comparative Sample 2A | Comparative Sample 3 | Sample 1A | Sample 3A | Sample 8A | Sample 10A | Sample 12A |
| --- | --- | --- | --- | --- | --- | --- | --- |
| 0.0 | | | | | | | |
| 0.1 | 0.00 (0.00) | 0.00 (0.00) | 0.12 (21) | 1.46 (256) | 3.10 (543) | 3.68 (644) | 2.73 (478) |
| 0.2 | 0.18 (31) | 0.00 (0.00) | 0.44 (77) | 2.44 (427) | 3.49 (611) | 3.62 (634) | 3.83 (671) |
| 0.4 | 0.46 (81) | 0.25 (44) | 2.67 (468) | 3.21 (562) | 3.57 (625) | 3.71 (650) | 3.96 (694) |

TABLE XI-continued

| Seal Time (s) | Comparative Sample 2A | Comparative Sample 3 | Sample 1A | Sample 3A | Sample 8A | Sample 10A | Sample 12A |
| --- | --- | --- | --- | --- | --- | --- | --- |
| 0.6 | 0.68 (119) | 0.32 (56) | | 3.11 (545) | 3.34 (585) | 3.41 (597) | 4.02 (704) |
| 0.8 | 0.73 (128) | 0.35 (61) | 3.82 (669) | 3.98 (697) | 3.38 (592) | 3.49 (611) | 3.92 (687) |
| 1.0 | 0.87 (152) | 0.37 (65) | 3.84 (672) | 3.64 (637) | 3.62 (634) | 3.19 (559) | 3.86 (676) |

Examples 25-28 illustrate that the use of ULDPE in the sealing layer of a film structure of the present invention is found to significantly increase the heat seal and hot tack range. The wider range of heat seal and hot tack would allow for faster line speeds on a VFFS unit.

Example 29

A. Pouch Fabrication

A Hayssen Ultima VFFS unit was used to make 2L water-filled pouches with a lay flat dimension of 7 inches (17.8 centimeters)×12.5 inches (31.8 centimeters) for drop testing. The following conditions were used on the Hayssen Ultima VFFS unit:
Model Number: RCMB2-PRA
M.A. Number: U19644
Mass of Water: 2,000 g
Bag Size: 7 inches×12.5 inches
Registration rolls on from 5° to 135°
Pull belts on from 5° to 135°
Jaw Close: from 136° to 275°
Platen: from 136° to 265°
Start Delay: 50 ms
Type of Seal: Lap A Pro/Fill 3000 liquid filler was attached to the VFFS. The settings on the Pro/Fill 3000 were:
P.S.: 99
Volume: 3539
C.O.A.: 70

B. Drop Testing of Water Filled Pouches

Two types of pouch drop tests were used to measure the performance of films produced in the Examples: (1) Milk Pouch Drop Test, and (2) Step Stair Drop Test. In the Milk Pouch Drop Test pouches were dropped "end-on" from a height of 5 feet (1.5 m). Any leak was classified as a failure. The pouches in the Step Stair Drop Test were also dropped "end-on" from varying heights to determine a pouch's "50% failure height". The "50% failure height" means the height at which 50 percent of the pouches dropped will fail (leak). Results of the drop testing are shown in Table XII below.

TABLE XII

| | | Pouch Drop Tests | | | | |
| --- | --- | --- | --- | --- | --- | --- |
| | | Milk Pouch Drop Test | | | Step Stair Drop Test | |
| | | At 5 Feet (1.5 m) Height | | | 50% Failure | Failure Rate at |
| Sample No. | Gauge (mil) | Number Tested | Number Failed | Failure (Percent) | Height, Feet (m) | 13 Feet (4 m) (percent) |
| Sample 1A | 3 | 100 | 7 | 7 | >13(>4 m) | 36 |
| Sample 1B | 2 | | | | 9.6(2.88 m) | |
| Sample 2A | 3 | | | | | |
| Sample 2B | 2 | COULD NOT RUN THROUGH VFFS | | | | |
| Comparative Sample 1A | 3 | COULD NOT MAKE - POUCH/SEAL FAILURE | | | | |
| Comparative Sample 1B | 2 | COULD NOT MAKE - POUCH/SEAL FAILURE | | | | |

TABLE XII-continued

Pouch Drop Tests

| | | Milk Pouch Drop Test At 5 Feet (1.5 m) Height | | | Step Stair Drop Test | |
|---|---|---|---|---|---|---|
| | | | | | 50% Failure | Failure Rate at |
| Sample No. | Gauge (mil) | Number Tested | Number Failed | Failure (Percent) | Height, Feet (m) | 13 Feet (4 m) (percent) |
| Comparative Sample 2A | 3 | 100 | 8 | 8 | 11.9(3.57 m) | |
| Comparative Sample 2B | 2 | 100 | 15 | 15 | 6.4(1.92 m) | |
| Sample 3A | 3 | | | | >13(>4 m) | 24 |
| Sample 3B | 2 | | | | 11.7(3.51 m) | |
| Sample 4A | 3 | 105 | 1 | 0.95 | >13(>4 m) | 20 |
| Sample 4B | 2 | 100 | 2 | 2 | 10.8(3.24 m) | |
| Sample 5A | 3 | | | | >13(>4 m) | 36 |
| Sample 5B | 2 | | | | | |
| Sample 6A | 3 | 105 | 1 | 0.95 | >13(>4 m) | 36 |
| Sample 6B | 2 | 100 | 3 | 3 | 10.4(3.13 m) | |
| Sample 7A | 3 | 105 | 1 | 0.95 | >13(>4 m) | 24 |
| Sample 7B | 2 | 100 | 2 | 2 | 9.8(2.94 m) | |
| Sample 8A | 3 | 100 | 1 | 1 | >13(>4 m) | 16 |
| Sample 8B | 2 | | | | 9.2(2.76 m) | |
| Sample 9A | 3 | 105 | 0 | 0 | >13(>4 m) | 16 |
| Sample 9B | 2 | 100 | 2 | 2 | 10.3(3.09 m) | |
| Sample 10A | 3 | 105 | 0 | 0 | >13(>4 m) | 16 |
| Sample 10B | 2 | | | | 10.5(3.15 m) | |
| Sample 11A | 3 | 105 | 1 | 0.95 | >13(>4 m) | 24 |
| Sample 11B | 2 | | | | | |
| Sample 12A | 3 | | | | >13(>4 m) | 24 |
| Sample 12B | 2 | | | | | |
| Comparative Sample 3 | 3 | 100 | 7 | 7 | 9.1(2.73 m) | |

Film Sample 7A was placed in the VFFS and 130 pouches were made of the sample film at the following temperatures:
Seam seal—235° F.
Front jaw—285° F.
Rear jaw—285° F.

One hundred five (105) pouches were dropped as per the Milk Pouch Drop Test and 25 were dropped as per the Step Stair Drop Test. In the Step Stair Drop Test, the maximum height that the pouches could be safely dropped from was 13 feet (4 m) as the results show in Table XII.

The following temperature settings were used to make all of the other films tested and shown in Table XII.
Seam seal—240° F.
Front jaw—300° F.
Rear jaw—300° F.

The number of pouches tested by the Milk Pouch Drop Test is shown in Table XII. The number of pouches tested by the Step Stair Drop Test was 25 for all samples.

Most of leakers for the 3 mil (76.2 microns) film in the Milk Pouch Drop Test and Step Stair Drop Test were from the seals. However, most of the leakers for the 2 mil (50.8 microns) films were film failures. The 2 mil (50.8 microns) films appeared to have stronger seals which was expected due to the thinner gauge through which sealing would occur.

As described in Table XII, the results of the Milk Pouch Drop Test showed that the 3 mil (76.2 microns) films (Samples of 9A and 10A) made with ULDPE (Resin E) in the sealing layer did not have any failures from the 5 foot (1.5 m) drop height. As noted in Table XII, a number of films could not be run on the VFFS.

Pouches made coextruded films with ULDPE (Resin D) in the sealing layer had Milk Pouch Drop Test failure rates less than the SM-3 Film and LLDPE/LDPE pouches.

The Milk Pouch Drop Test for the 2 mil (50.8 microns) samples showed that the LLDPE/LDPE pouch (Comparative Sample 2B) had the highest failure rate (15 percent) and Sample 4B with ULDPE layer had the lowest failure rate (2 percent). Unlike the 3 mil (76.2 microns) film where all of the failures were seal related, the 2 mil (50.8 microns) film failures were film related.

With regard to the Step Stair Drop Test, the SM-3 Film was found to have a "50% failure height" of about 9.1 feet (2.73 m) as shown in Table XII.

The 3 mil (76.2 microns) films made with ULDPE had "50% failure heights" greater than 13 feet (4 m). Since 13 feet (4 m) was the maximum height that the pouches could be safely dropped, 25 pouch samples were dropped from a height of 13 feet (4 m) and the percent failure at 13 feet (4 m) was determined.

The 2 mil (50.8 microns) LLDPE/LDPE pouch (Comparative Sample 2B) had the lowest "50% failure height", while the ULDPE coextruded films had higher "50% failure heights". All of the film failures were film related as opposed to seal related.

Example 29 shows that water filled pouches made with ULDPE in the sealing layer are found to have a low failure rate in the Milk Pouch Drop Test, and a high "50% failure height" in the Step Stair Drop Test.

More particularly, the coextruded films for the pouches of the present invention having a heat seal layer comprised of an ULDPE provide a broader sealing range for pouch conversion and provide physical properties in finished pouches such that the pouches have a reduced failure rate.

What is claimed is:

1. A process for preparing a pouch containing a flowable material comprising forming a film structure by either blown tube extrusion or cast extrusion, forming the film structure into a tubular member and transversely heat-sealing opposite ends of the tubular member, said tubular member comprising a film structure for a pouch container comprising (a) from 10 to 100 percent by weight of at least one polymeric seal layer of an ultra low density linear ethylene copolymer interpolymerized from ethylene and at least one alpha-olefin in the range of $C_3$–$C_{10}$ and having (1) a density of from about 0.89 g/cm³ to less than 0.915 g/cm³, (2) a melt index of less than about 10.0 g/10 minutes and (3) (i) a hot tack or heat seal initiation temperature of less than 100° C. at a force of at least 1N/inch (39.4N/m) or (ii) achieving a hot tack strength of at least 1N/inch (39.4N/m) at a seal bar temperature of about 110° C. at less than 0.2 seconds using the DTC Hot Tack Strength Method or achieving a heat seal strength of at least 1 lb$_f$/inch (175N/m) at a seal bar temperature of about 110° C. at less than 0.25 seconds using the DTC Heat Seal Strength Method; and (b) from 0 to 90 percent by weight of at least one polymer selected from the group consisting of a linear copolymer of ethylene and a $C_3$–$C_{18}$-alpha-olefin having a density of greater than 0.916 g/cm³ and a melt index of from 0.1 to 10 g/10 minutes, a high-pressure low density polyethylene having a density of from 0.916 to 0.930 g/cm³ and a melt index of from 0.1 to 10 g/10 minutes and ethylene-vinyl acetate copolymer having a weight ratio of ethylene to vinyl acetate from 2.2:1 to 24:1 and a melt index of from 0.2 to 10 g/10 minutes.

2. A process for preparing a pouch containing a flowable material comprising forming a film structure by either blown tube extrusion or cast extrusion, forming the film structure into a tubular member and transversely heat sealing opposite ends of the tubular member, said tubular member comprising:

(I) (a) from 10 to 100 percent by weight of at least one polymeric seal layer of an ultra low density linear ethylene copolymer interpolymerized from ethylene and at least one alpha-olefin in the range of $C_3$–$C_{10}$ and having (1) a density of from about 0.89 g/cm³ to less than 0.915 g/cm³, (2) a melt index of less than about 10.0 g/10 minutes and (3) (i) a hot tack or heat seal initiation temperature of less than 100° C. at a force of at least 1N/inch (39.4N/m) or (ii) achieving a hot tack strength of at least 1N/inch (39.4N/m) at a seal bar temperature of about 110° C. at less than 0.2 seconds using the DTC Hot Tack Strength Method or achieving a heat seal strength of at least 1 lb$_f$/inch (175N/m) at a seal bar temperature of about 110° C. at less than 0.25 seconds using the DTC Heat Seal Strength Method; and (b) from 0 to 90 percent by weight of at least one polymer selected from the group consisting of a linear copolymer, of ethylene and a C3-C18-alpha-olefin having a density of greater than 0.916 g/cm³ and a melt index of from 0.1 to 10 g/10 minutes, a high-pressure low density polyethylene having a density of from 0.916 to 0.930 g/cm³ and a melt index of from 0.1 to 10 g/10 minutes and ethylene-vinyl acetate copolymer having a weight ratio of ethylene to vinyl acetate from 2.2:1 to 24:1 and a melt index of from 0.2 to 10 g/10 minutes; and (II) at least one layer of a linear low density ethylene-$C_3$-$C_{18}$-alpha-olefin copolymer having a density of from about 0.916 to about 0.935 and a melt index of from about 0.1 to about 10 g/10 minutes.

3. The process of claim 2 wherein the film structure includes:

(III) at least one layer of a high-pressure polyethylene having a density of from 0.916 to 0.930 g/cm³ and a melt index of from 0.1 to 10 g/10 minutes.

* * * * *